US006865664B2

(12) United States Patent
Budrovic et al.

(10) Patent No.: US 6,865,664 B2
(45) Date of Patent: Mar. 8, 2005

(54) METHODS, SYSTEMS, AND COMPUTER PROGRAM PRODUCTS FOR COMPRESSING A COMPUTER PROGRAM BASED ON A COMPRESSION CRITERION AND EXECUTING THE COMPRESSED PROGRAM

(75) Inventors: Martin T. Budrovic, Las Flores, CA (US); David J. Kolson, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 815 days.

(21) Appl. No.: 09/736,682

(22) Filed: Dec. 13, 2000

(65) Prior Publication Data

US 2002/0169946 A1 Nov. 14, 2002

(51) Int. Cl.[7] .............................................. G06F 12/00
(52) U.S. Cl. ...................................... 712/209; 712/210
(58) Field of Search ................................ 712/209, 210

(56) References Cited

U.S. PATENT DOCUMENTS

| | | | | |
|---|---|---|---|---|
| 5,410,671 | A | 4/1995 | Elgamal et al. ............. | 395/425 |
| 5,764,994 | A | 6/1998 | Craft ........................... | 395/709 |
| 5,901,310 | A | 5/1999 | Rahman et al. ............. | 395/651 |
| 5,905,893 | A * | 5/1999 | Worrell ....................... | 717/151 |
| 5,991,452 | A | 11/1999 | Shimizu et al. ............. | 382/248 |
| 6,199,126 | B1 * | 3/2001 | Auerbach et al. ............. | 710/68 |
| 6,263,429 | B1 * | 7/2001 | Siska ........................... | 712/245 |
| 6,484,228 | B2 * | 11/2002 | Breternitz et al. ............. | 711/1 |
| 6,564,314 | B1 * | 5/2003 | May et al. ................... | 712/210 |
| 6,587,939 | B1 * | 7/2003 | Takano ........................ | 712/210 |
| 6,654,874 | B1 * | 11/2003 | Lee ............................. | 712/209 |

OTHER PUBLICATIONS

Lekatsas et al., *Code Compression as a Variable in Hardware/Software Co–Design,* Eighth International Workshop on Hardware/Software Co–Design, May 2000, pp. 120–124.
Lekatsas et al., *Arithmetic Coding for Low Power Embedded System Design,* IEEE, Proceedings of the Data Compression Conference 2000, pp. 430–439.

(List continued on next page.)

*Primary Examiner*—Eric Coleman
(74) *Attorney, Agent, or Firm*—Myers Bigel Sibley & Sajovec

(57) ABSTRACT

Embodiments of systems, methods, and computer program products are provided for compressing a computer program based on a compression criterion and executing the compressed program. For example, a computer program may be compressed by scanning an initial computer program to identify one or more uncompressed instructions that have a high frequency of use. A storage mechanism, such as a data structure, may then be populated with the identified uncompressed instructions. A compressed computer program may be generated by respectively replacing one or more of the identified uncompressed instructions with a compressed instruction that identifies a location of the corresponding uncompressed instruction in the storage mechanism. Additional compression of the computer program may be achieved by scanning the compressed computer program to identify one or more uncompressed instructions that have a high frequency of use when at least a portion of their instruction operand is ignored. A second storage mechanism, such as a data structure, may then be populated with the identified uncompressed instructions. Finally, a further compressed computer program may be generated by respectively replacing one or more of the identified uncompressed instructions with a second type of compressed instruction that identifies a location of the corresponding uncompressed instruction in the second storage mechanism.

75 Claims, 24 Drawing Sheets

OTHER PUBLICATIONS

Lefurgy et al., *Evaluation of a High Performance Code Compression Method,* Proceedings of Micro–32, Nov. 16–18, 1999, pp. 93–102.

Benini et al., *Region Compression: A New Scheme for Memory Energy Minimization in Embedded Systems,* Proceedings of the 25th EUROMICRO Conference, 1999, pp. 311–317.

Larin et al, *Compiler–Driven Cached Code Compression Schemes for Embedded ILP Processors,* Proceedings of the 32nd Annual ACM/IEEE International Symposium on Microarchitecturei, 1999, pp. 82–91.

Lekatsas et al., *SAMC: A Code Compression Algorithm for Embedded Processors,* IEEE Transactions on Computer–Aided Design of Integrated Circuits and Systems, vol. 18, No. 12, Dec. 1999, pp. 1689–1701.

Liao et al., *Code Density Optimization for Embedded DSP Processors Using Data Compression Techniques,* IEEE Transactions on Computer–Aided Design of Integrated Circuits and Systems, vol. 17, No. 7, Jul. 1998, pp. 601–609.

Araujo et al., *Code Compression Based on Oper and Factorization,* Proceedings of the 31st Annual ACM/IEEE International Symposium on Microarchitecture, 1998, pp. 194–201.

Lekatsas et al., *Code Compression for Embedded Systems,* Proceedings of the 35th Design Automation Conference, Jun. 1998, pp. 516–521.

* cited by examiner

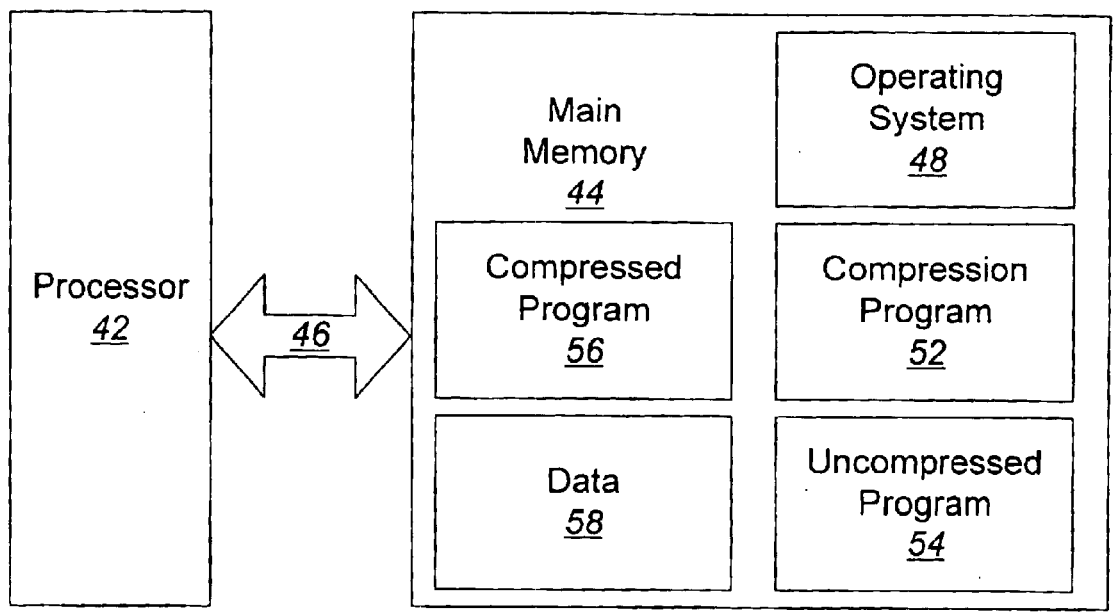
FIG. 2
FIG. 3A  Uncompressed Instruction
Type I Compressed Instruction
FIG. 3B
Type II Compressed Instruction
FIG. 3C
Type III Compressed Instruction
FIG. 3D

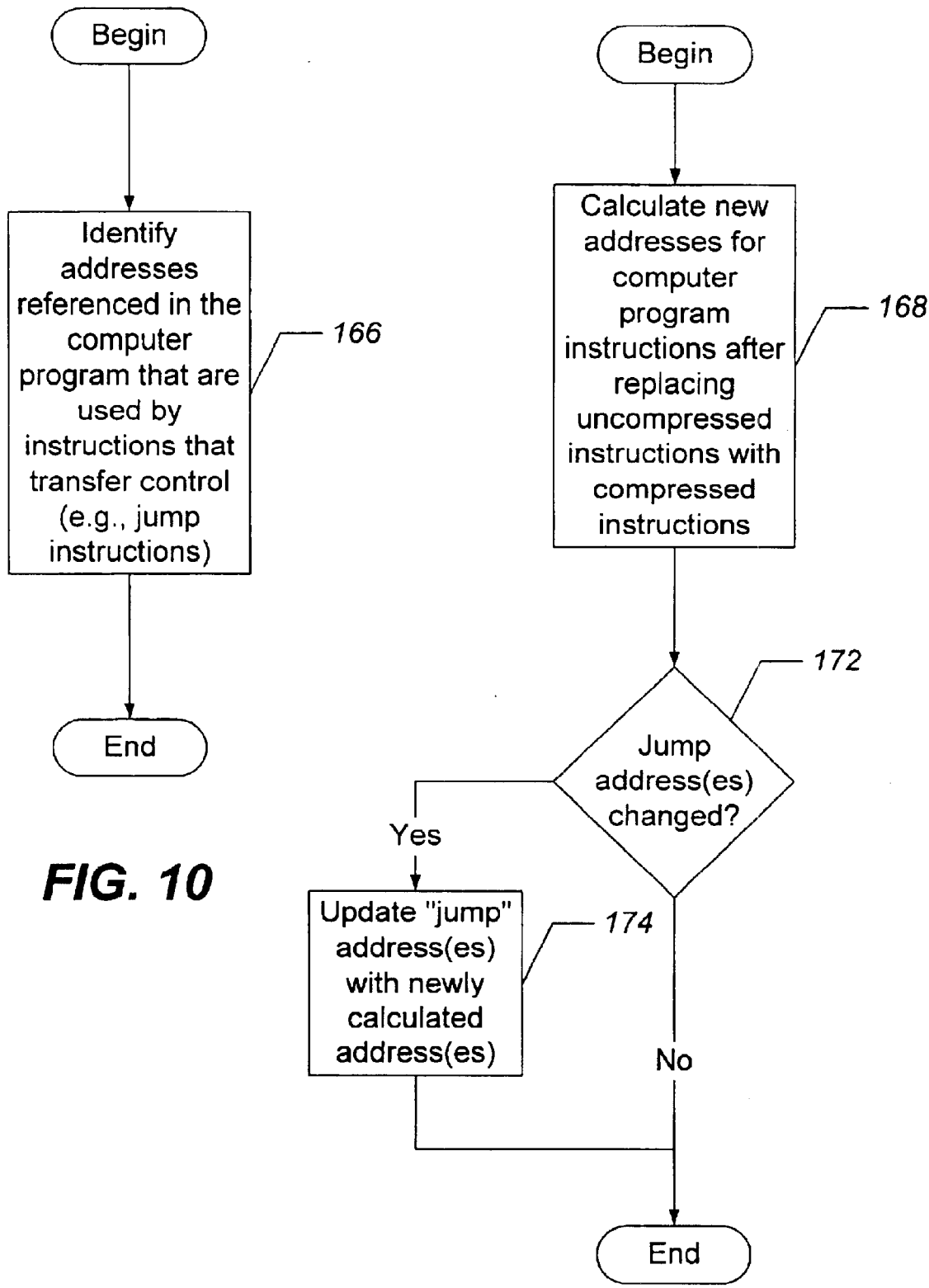

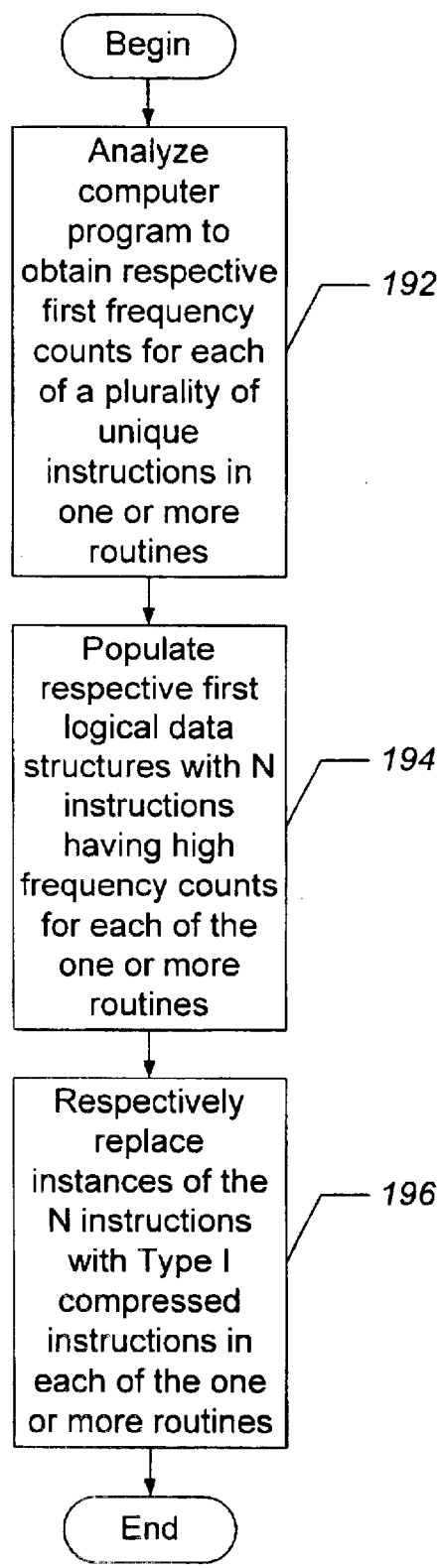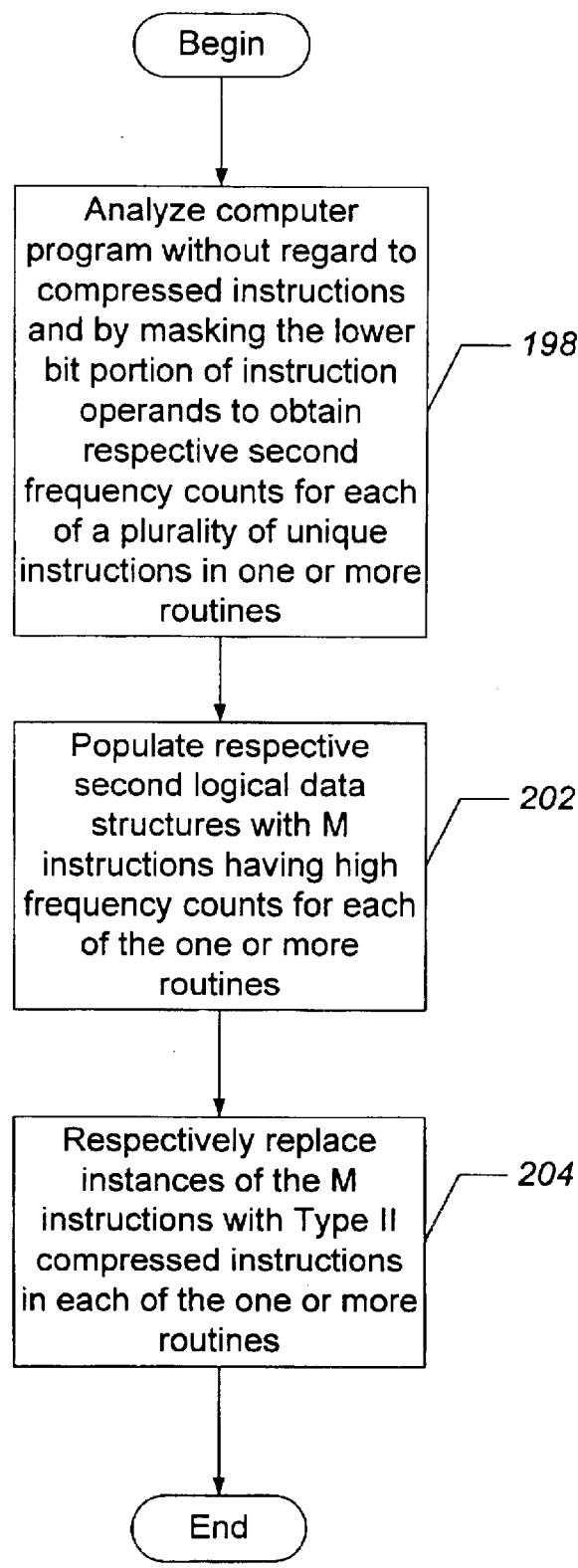
FIG. 13
FIG. 14

METHODS, SYSTEMS, AND COMPUTER PROGRAM PRODUCTS FOR COMPRESSING A COMPUTER PROGRAM BASED ON A COMPRESSION CRITERION AND EXECUTING THE COMPRESSED PROGRAM

BACKGROUND OF THE INVENTION

The present invention relates generally to the field of computer programming and, more particularly, to compressing computer programs so as to conserve memory resources.

Computer program size for certain embedded applications appears to be growing at a rapid pace. For example, mobile terminals supporting Phase One of the Global System for Mobile Communications (GSM) protocol typically use approximately 32k bytes of digital signal processor (DSP) memory. Current expectations are that mobile terminals supporting the third generation (3G) GSM protocol may require more than 500k bytes of DSP memory. As more features and enhanced functionality are targeted for embedded applications, program size may continue to increase resulting in a corresponding increase in memory usage. The increased memory usage may become a more important factor in both the size and cost of embedded systems.

One approach to conserving memory resources is to design processors with variable length instruction sets. In these architectures, instructions that are more frequently used may be assigned to shorter instructions. Unfortunately, this approach is not application specific, but instead is based on general assumptions of instruction usage. As a result, in certain types of applications, the shortest instructions may not necessarily be used more frequently than the longer instructions.

Another approach to conserving memory resources is to apply a coding algorithm to each instruction in a computer program to achieve a desired level of program compression. One disadvantage to this approach, however, is that an extra step is added during execution of the program to decompress each instruction first before it is executed. Accordingly, execution speed and efficiency may be diminished to reduce memory consumption.

Consequently, there remains a need for improved methods and systems for compressing computer programs and executing these compressed programs.

SUMMARY OF THE INVENTION

Embodiments of the present invention may include methods, systems, and computer program products for compressing a computer program based on a compression criterion and executing the compressed program. For example, a computer program may be compressed by scanning an initial computer program to identify one or more uncompressed instructions that have a high frequency of use. A storage mechanism, such as a data structure, may then be populated with the identified uncompressed instructions. A compressed computer program may be generated by respectively replacing one or more of the identified uncompressed instructions with a compressed instruction that identifies a location of the corresponding uncompressed instruction in the storage mechanism.

Advantageously, in accordance with the present invention, by replacing more frequently used instructions in a program with shorter instructions, memory resources may be conserved. Moreover, the dynamic assignment of compressed instructions based on the instruction frequencies in specific application programs may provide improved program execution efficiency over alternative solutions that compress every instruction by a specific amount. That is, in accordance with the present invention, more frequently used instructions may be replaced with compressed instructions, but less frequently used instructions may not be replaced, thereby eliminating the need to decompress these less frequently used instructions before execution. By adjusting the frequency thresholds before an instruction qualifies for replacement with a compressed instruction, a suitable balance between memory conservation and execution speed may be obtained.

Additional compression of the computer program may be achieved by scanning the compressed computer program to identify one or more uncompressed instructions that have a high frequency of use when at least a portion of their instruction operand is ignored. A second storage mechanism, such as a data structure, may then be populated with the identified uncompressed instructions. Finally, a compressed computer program may be generated by respectively replacing one or more of the identified uncompressed instructions with a second type of compressed instruction that identifies a location of the corresponding uncompressed instruction in the second storage mechanism.

Addresses of certain instructions in the compressed computer program may be different than the addresses of those instructions in the uncompressed computer program. Therefore, in accordance with further embodiments of the present invention, addresses that are referenced in the initial computer program by instructions that transfer control (e.g., jump, goto, or branch instructions) may be identified and new addresses calculated therefor after the initial computer program has been compressed (i.e., one or more uncompressed instructions have been replaced by one or more compressed instructions). A determination may then be made whether the addresses referenced by the instructions that transfer control have changed as a result of compressing the computer program. If any of these addresses have changed, then they may be updated in the compressed program with a newly calculated address that corresponds thereto.

The identified addresses that are referenced by instructions that transfer control and have changed may be associated in a storage mechanism, such as a data structure, with a newly calculated address that corresponds thereto. This data structure may be referenced when updating the addresses in the compressed program.

The foregoing methods of compressing a computer program may be applied on a per routine basis. That is, each one of a plurality of routines in a computer program may be scanned or analyzed to identify one or more uncompressed instructions therein that have a high frequency of use. Storage mechanisms, such as data structures, may then be respectively populated with the identified uncompressed instructions from the respective routines. A compressed computer program may be generated by respectively replacing one or more of the identified uncompressed instructions in each of the routines with a compressed instruction that identifies a location of the corresponding uncompressed instruction in a respective one of the storage mechanisms.

Even more compression of the computer program may be achieved by respectively scanning each of the plurality of routines in the compressed computer program to identify one or more uncompressed instructions therein that have a high frequency of use when at least a portion of their instruction operand is ignored. Second storage mechanisms, such as data structures, may then be respectively populated with the identified uncompressed instructions from the respective routines. Finally, a compressed computer program may be generated by respectively replacing one or more of the identified uncompressed instructions in each of the routines with a second type of compressed instruction that identifies a location of the corresponding uncompressed instruction in a respective one of the second storage mechanisms.

By compressing an uncompressed program on a per routine basis, a higher level of compression may be achieved in the compressed program than would otherwise be achieved if the exemplary compression methodologies, according to the present invention, were applied to the uncompressed program as a whole.

The present invention may also be embodied as methods, systems, and computer program products for executing a computer program. In this regard, an instruction may be fetched from a memory and decoded to determine whether the fetched instruction is uncompressed or is a first or second type of compressed instruction. If the fetched instruction is a first type of compressed instruction, then the fetched instruction may be decoded to identify a location in a first logical data structure. An instruction, which is located at the identified location in the first logical data structure, may then be provided to a processor for execution. Similarly, if the fetched instruction is a second type of compressed instruction, then the fetched instruction may be decoded to identify a location in a second logical data structure. Portions of the fetched instruction may be combined with portions of an at least partially uncompressed instruction that is located at the identified location in the second logical data structure. This combined instruction may then be provided to a processor for execution.

The first and second logical data structures may be downloaded to first and second decompression sub-engines before the fetched instruction is decoded. The fetched instruction may be provided to the first decompression sub-engine if the fetched instruction is a first type of compressed instruction and to the second decompression sub-engine if the fetched instruction is a second type of compressed instruction.

A computer program that has been compressed on a per routine basis as discussed hereinabove may be executed by fetching an instruction that is associated with one of a plurality of routines from a memory. The fetched instruction may then be decoded to determine whether the fetched instruction is an uncompressed instruction or whether the instruction is a first type of compressed instruction. If the fetched instruction is a first type of fetched instruction, then the fetched instruction may be decoded to identify a location in a first logical data structure that is exclusively associated with the routine in which the fetched instruction resides. Finally, an instruction located at the identified location in the first logical data structure may be provided to a processor for execution.

The fetched instruction may also be decoded to determine whether the fetched instruction is a second type of fetched instruction. If the fetched instruction is a second type of fetched instruction, then the fetched instruction may be decoded to identify a location in a second logical data structure that is exclusively associated with the routine in which the fetched instruction resides. Portions of the fetched instruction may be combined with portions of an at least partially uncompressed instruction that is located at the identified location in the second logical data structure. This combined instruction may then be provided to a processor for execution.

The present invention may also be embodied as methods, systems, and computer program products for operating a decompression unit for compressed computer program instructions. In this regard, an instruction may be loaded into a buffer from a memory and an instruction address may be received from a processor. A determination may then be made whether the instruction address corresponds to a sequential instruction. If the instruction address corresponds to a sequential instruction, then the instruction in the buffer may be decoded to determine whether the instruction is a compressed instruction or an uncompressed instruction. The decoded instruction may then be removed from the buffer. By verifying that the instruction address corresponds to a sequential instruction, the decompression unit may provide the next instruction in the program sequence (e.g., the instruction contained in the buffer) to the processor for execution.

If the instruction address received from the processor does not correspond to a sequential instruction, then the buffer may be cleared and then loaded with an instruction that is located in the memory at the received instruction address. This instruction that has been loaded into the buffer may then be decoded to determine whether the instruction is a compressed or an uncompressed instruction.

The present invention may also be embodied as data processing systems for decompressing compressed computer program instructions. In this regard, exemplary data processing systems may include an instruction type decoding unit that is configured to receive an instruction at a data input thereof and to determine whether the received instruction is an uncompressed or a first or second type of compressed instruction. A first decompression sub-engine may be communicatively coupled to a first output of the first decompression sub-engine for receiving compressed instructions of the first type. Similarly, a second decompression sub-engine may be communicatively coupled to a second output of the instruction type decoding unit for receiving compressed instructions of the second type.

The first and second decompression sub-engines may include first and second memories, respectively, that are configured with respective first and second data structures in which compressed instructions of the first and second types are respectively associated with first and second uncompressed or at least partially uncompressed instructions.

The first and second decompression sub-engines are communicatively coupled to a main memory and the instruction type decoding unit includes a data structure load unit. The data structure load unit may be configured to detect a data structure load instruction and, in response thereto, may facilitate downloading the first and second data structures to the first and second decompression sub-engines, respectively.

A multiplexer may be communicatively coupled to outputs of the instruction type decoding unit, the first decompression sub-engine, and the second decompression sub-engine. In addition, the multiplexer may have a select input that receives a select signal that is generated by the instruction type decoding unit.

The data processing system may further include an address translation unit that receives an instruction address from a processor and generates a jump signal in response thereto if the instruction address indicates a transfer of control (e.g., a jump, goto, or branch instruction) and generates a sequential signal if the instruction address is indicative of sequential program execution. A memory fetch unit may be communicatively coupled to the address translation unit and may include respective inputs for receiving the jump signal, the sequential signal, and the instruction address from the address translation unit. The memory fetch unit may also be communicatively coupled to a main memory. A current address register may be communicatively coupled to the memory fetch unit and the instruction type decoding unit and contains an address of the instruction received by the instruction type decoding unit. The current address register may be viewed as maintaining a program counter for a compressed computer program.

The data processing system may further include a buffer that is communicatively coupled to both the main memory for receiving instructions therefrom and the instruction type decoding unit for providing instructions received from the main memory thereto. The buffer may further include a reset input that is coupled to the jump signal for clearing the buffer in case of a transfer of control.

Thus, the present invention may be used to dynamically compress a computer program based on a compression criterion (e.g., histograms of the instruction types, instruction execution speed, etc.). Because the present invention avoids assigning compressed or short instructions to specific uncompressed instructions, a priori, the compression methodologies taught herein may have improved adaptability in their application to varying types of computer programs. Furthermore, a compressed computer program, in accordance with the present invention, may be executed with relatively few hardware modifications to a conventional processor architecture.

While the present invention has been described above primarily with respect to method and system aspects of the invention, it will be understood that the present invention may be embodied as methods, systems, and/or computer program products.

BRIEF DESCRIPTION OF THE DRAWINGS

Other features of the present invention will be more readily understood from the following detailed description of specific embodiments thereof when read in conjunction with the accompanying drawings, in which:

FIG. 2 is a software architecture block diagram that illustrates methods, systems, and computer program products for compressing a computer program based on a compression criterion and executing the compressed program in accordance with embodiments of the present invention;

FIGS. 3A–3D are instruction format diagrams that illustrate uncompressed and compressed instruction formats in accordance with embodiments of the present invention;

FIGS. 8–16B are flowcharts that illustrate exemplary operations of methods, systems, and computer program products for compressing a computer program based on a compression criterion and executing the compressed program in accordance with embodiments of the present invention;

DETAILED DESCRIPTION OF PREFERRED EMBODIMENTS

Figure 1:
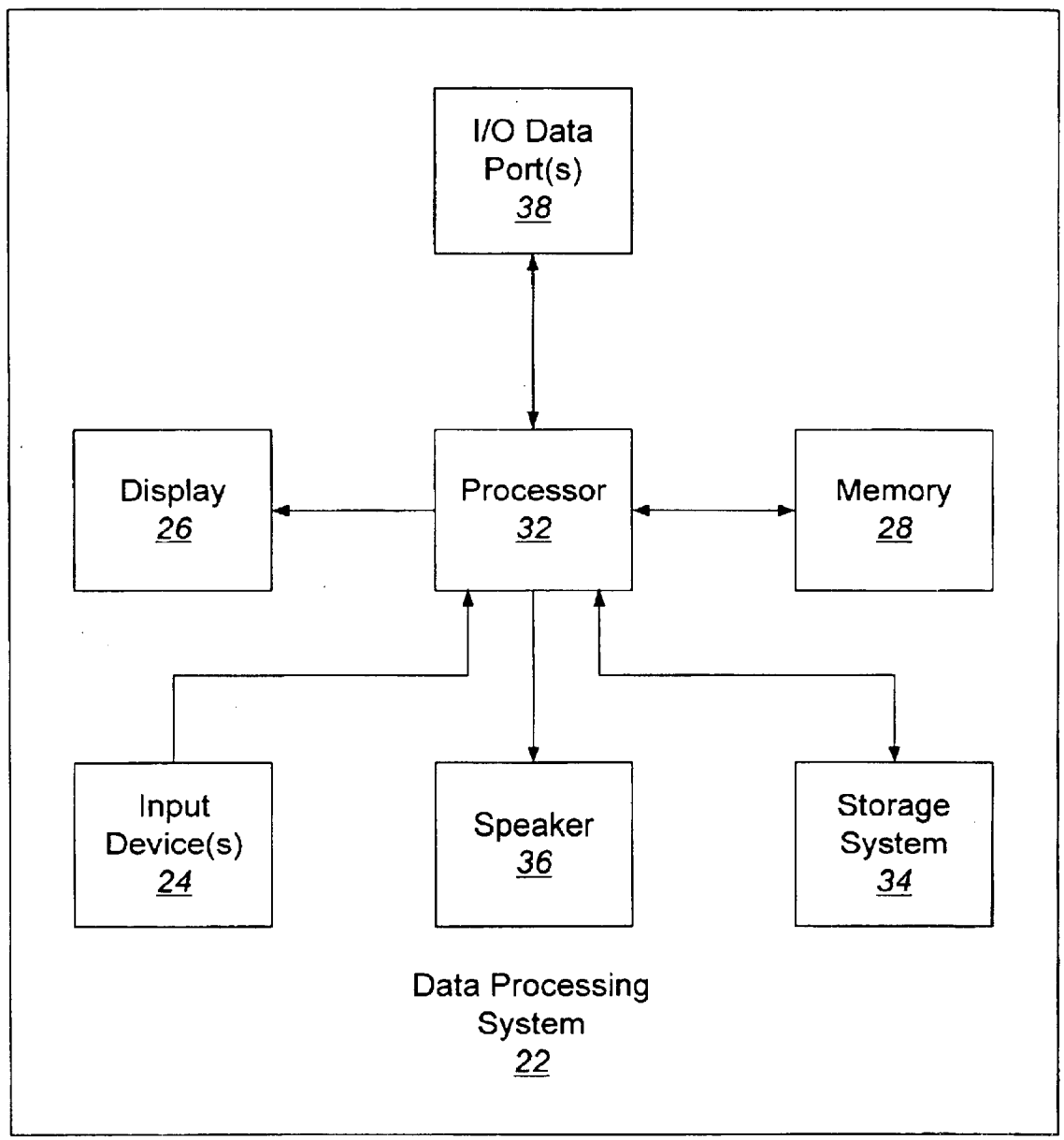
FIG. 1 is a block diagram that illustrates data processing systems in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention is described herein in the context of compressing a computer program based on a compression criterion. In particular, for purposes of illustration, exemplary embodiments of the present invention are illustrated and discussed hereafter using instruction frequency counts as the compression criterion. Nevertheless, it will be understood that alternative compression criteria may also be used, such as instruction execution speed, for example. That is, it may be desirable to execute certain instructions as rapidly as possible. These instructions, therefore, may not be desirable candidates for compression as the steps involved in uncompressing these instructions during execution may slow execution speed.

The present invention may be embodied as methods, systems, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 1, an exemplary data processing system 22 architecture, in accordance with embodiments of the present invention, may include input device(s) 24, such as a keyboard or keypad, a display 26, and a memory 28 that communicate with a processor 32. The data processing system 22 may further include a storage system 34, a speaker 36, and an input/output (I/O) data port(s) 38 that also communicate with the processor 32. The storage system 34 may include removable and/or fixed media, such as floppy disks, ZIP drives, hard disks, or the like, as well as virtual storage, such as a RAMDISK. The I/O data port(s) 38 may be used to transfer information between the data processing system 22 and another computer system or a network (e.g., the Internet). These components may be conventional components such as those used in many conventional computing devices, which may be configured to operate as described herein.

FIG. 2 illustrates a processor 42 and a main memory 44 that may be used in embodiments of methods, systems, and computer program products for compressing a computer program based on a compression criterion and executing the compressed program in accordance with embodiments of the present invention. The processor 42 communicates with the main memory 44 via an address/data bus 46. The processor 42 may be, for example, a commercially available or custom microprocessor. The main memory 44 is representative of the overall hierarchy of memory devices containing the software and data used to compress a computer program based on a compression criterion and to execute the compressed program in accordance with embodiments of the present invention. The main memory 44 may include, but is not limited to, the following types of devices: cache, ROM, PROM, EPROM, EEPROM, flash, SRAM, and DRAM.

As shown in FIG. 2, the main memory 44 may hold five major categories of software and data: the operating system 48, the compression program module 52, the uncompressed program module 54, the compressed program module 56, and the data module 58. The operating system 48 controls the operation of the computer system. In particular, the operating system 48 may manage the computer system's resources and may coordinate execution of programs by the processor 42. The compression program 52 may be configured to analyze the uncompressed program 54 to obtain frequency counts for instructions contained therein. These counts may be based on, for example, the uncompressed program 54 as a whole or, alternatively, the counts may be obtained for one or more specific routines that comprise the uncompressed program 54. In accordance with embodiments of the present invention, the compression program 52 may replace instances of certain instructions in the uncompressed program 54 with compressed instructions to generate the compressed program 56.

FIGS. 3A–3D are instruction format diagrams that illustrate uncompressed and compressed instruction formats in accordance with embodiments of the present invention. As shown in FIGS. 3A–3D, in an exemplary embodiment in which four instruction types are defined, two high-order bits are used to designate the instruction type. For example, FIG. 3A illustrates a 32 bit uncompressed instruction, which is designated by the high-order bit sequence 11. For illustrative purposes, it may be assumed that the uncompressed program 54 comprises uncompressed instructions as shown in FIG. 3A. FIG. 3B illustrates a Type I compressed instruction, which comprises 8 bits and is designated by the high-order bit sequence 00. FIG. 3C illustrates a Type II compressed instruction, which comprises 16 bits and is designated by the high-order bit sequence 01. FIG. 3D illustrates a Type III compressed instruction, which comprises 16 bits and is designated by the high-order bit sequence 10. Because the two high-order bits are used to designate the instruction type in an exemplary embodiment of the present invention, these two bits may be viewed as an instruction type field.

Figure 4:
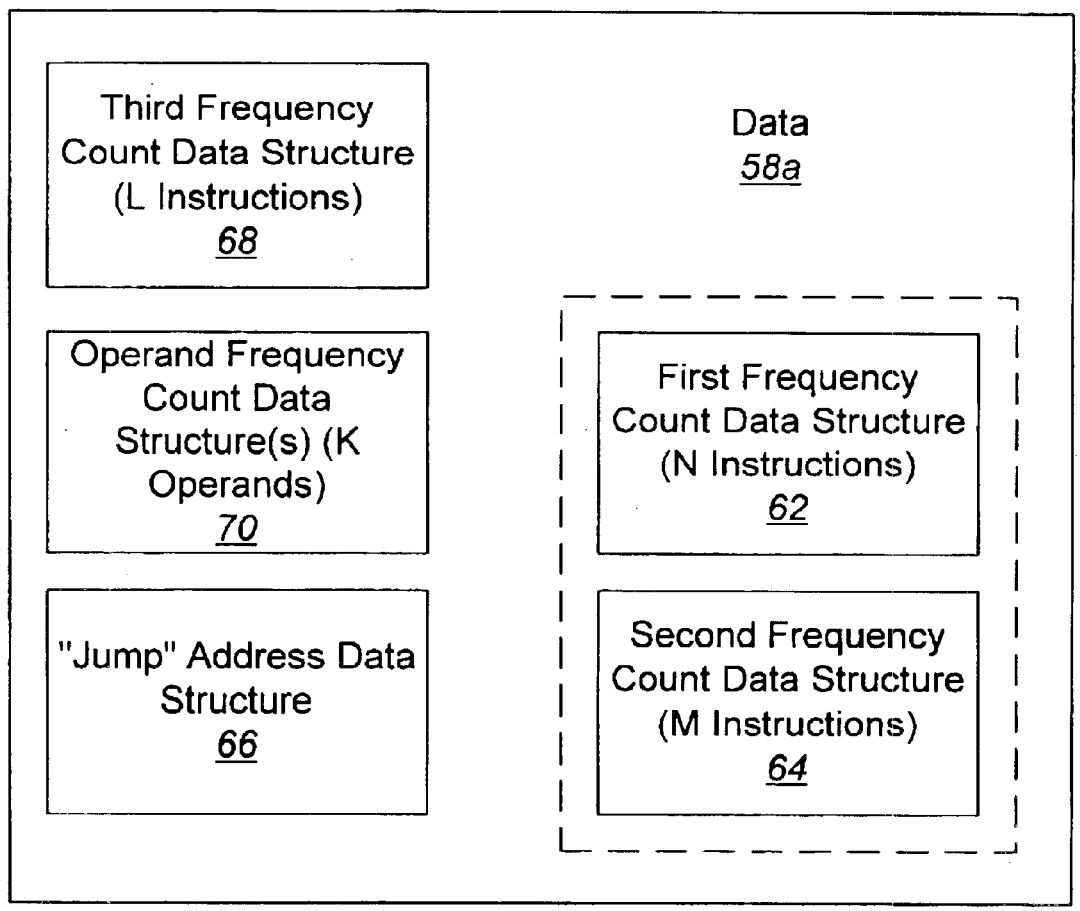
FIGS. 4–5 are software architecture block diagrams that illustrate data structures that may be used in methods, systems, and computer program products for compressing a computer program based on a compression criterion and executing the compressed program in accordance with alternative embodiments of the present invention.

Returning to FIG. 2, the data module 58 represents both the dynamic and static data used by the aforementioned software modules to carry out their respective operations. For example, as illustrated in FIG. 4, the data module 58a may comprise a first frequency count data structure 62 and a second frequency count data structure 64. The first frequency count data structure 62 may comprise the N uncompressed instructions in the uncompressed program 54 that are determined to have high frequency counts (e.g., the N highest frequency counts). The compression program 52 may, for example, replace instances of these N instructions in the uncompressed program 54 with Type I compressed instructions, shown in FIG. 3B, to generate the compressed program 56. The second frequency count data structure 64 may comprise the M uncompressed instructions that are determined to have high frequency counts (e.g., the M highest frequency counts) after instances of the N uncompressed instructions in the first frequency count data structure 62 have been discarded (i.e., replaced by Type I compressed instructions) and all or portions of instruction operands have been masked. This may identify frequently used instructions that vary based only on the operand data. The compression program 52 may, for example, replace instances of these M instructions in the uncompressed program 54 with Type II compressed instructions, shown in FIG. 3C, to generate the compressed program 56. The first frequency count data structure 62 and the second frequency count data structure 64 may be viewed as logical data structures because they may be implemented in software as a single data structure (e.g., a multidimensional array) as represented by the dashed box or as separate data structures.

The Type III compressed instruction type (see FIG. 3D) may be reserved as a spare category for future use by the compression program 54 to replace a third category of uncompressed instructions, which may be defined based on instruction frequency or other suitable criteria. Accordingly, a data structure may also be defined that contains the uncompressed instructions that have been replaced by Type III compressed instructions. In this regard, a third frequency count data structure 68 may be defined that comprises L instructions that are determined to have high frequency counts based on the non-operand portion thereof. Furthermore, one or more operand frequency count data structures 70 may be defined that respectively comprise K operands that are determined to have high frequency counts. For example, an operand frequency count data structure 70 may be defined for each operand position in an instruction. The operands having high frequency counts at that operand position may be stored in the operand frequency count data structure 70 for that operand position.

In addition to the first frequency count data structure 62 and the second frequency count data structure 64, the data module 58*a* may include a "jump" address data structure 66. The uncompressed program 54 may include instructions that transfer control. The uncompressed program 54 may contain both conditional and unconditional transfer of control instructions. Examples of these instructions may include jump instructions, goto instructions, and the like. When generating the compressed program 56, the compression program 52 may determine that one or more of the addresses that are referenced or used by the instructions that transfer control have changed as a result of replacing uncompressed instructions with compressed instructions. Accordingly, the "jump" address data structure 66 may be used to associate addresses that are used by the instructions that transfer control in the uncompressed program 54 with new addresses that correspond thereto based on the layout of the compressed program 56 in the main memory 44.

Figure 5:
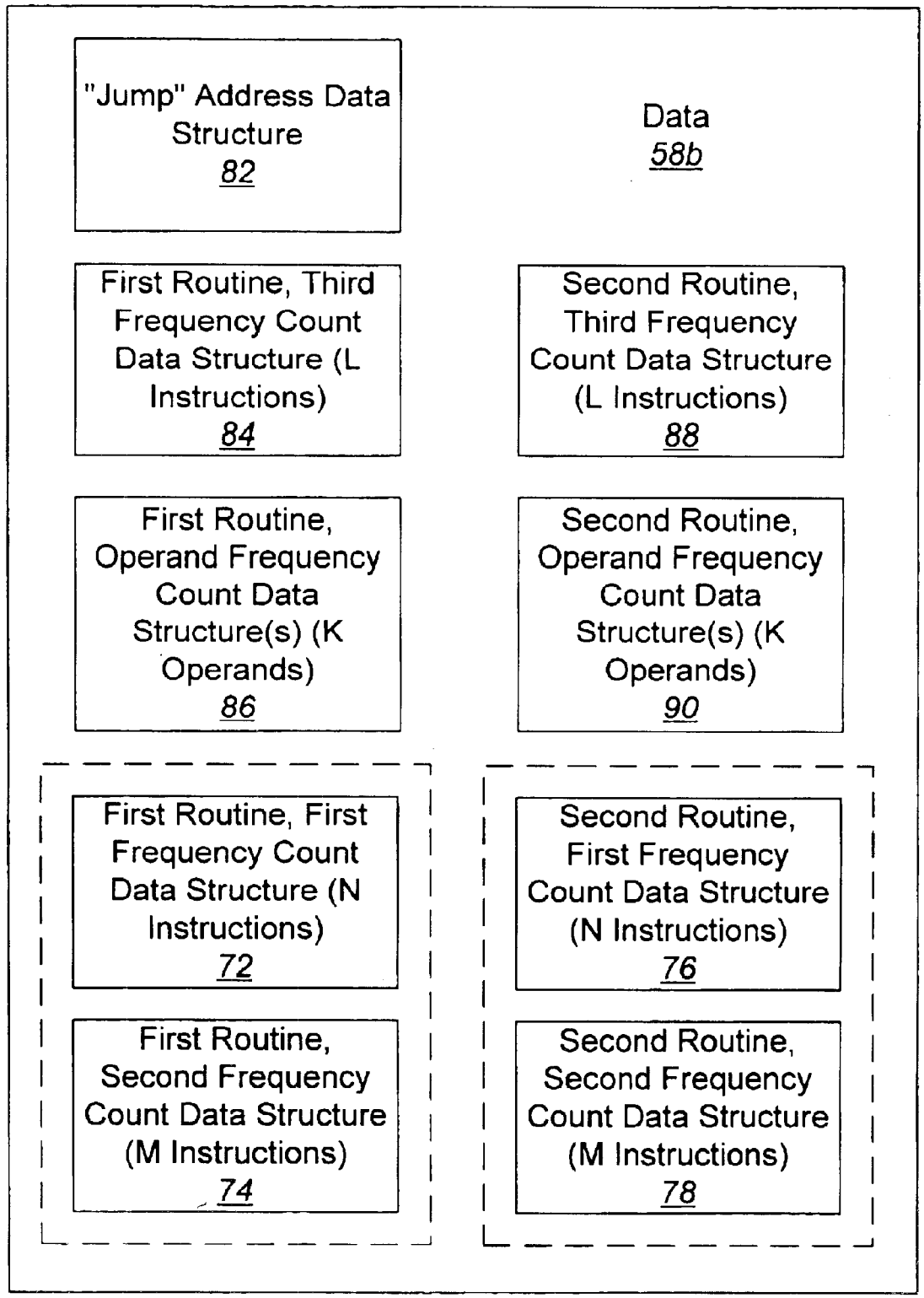

Alternative embodiments of the data module 58 are illustrated in FIG. 5. Rather than obtaining first, second, and/or third instruction frequency counts and/or operand frequency counts for the entire uncompressed program 54, the first, second, and or third instruction frequency counts and/or operand frequency counts may be obtained separately for routines comprising the uncompressed program. In the context of the present invention, a routine is any section of code that may be invoked (i.e., executed) within a program. Typically, a routine has a name or identifier that is associated with it and the routine may be invoked or executed by referencing that name.

Thus, as shown in FIG. 5, the data module 58*b* may comprise a first frequency count data structure 72, a second frequency count data structure 74, a third frequency count data structure 84, and operand frequency count data structure(s) 86, which are analogous to the first, second, third, and operand frequency count data structures 62, 64, 68, and 70, but are associated with a first routine of the uncompressed program 54. The first frequency count data structure 72 and the second frequency count data structure 74, which are associated with the first routine, may be implemented in software as a single data structure, as represented by the dashed box or as separate data structures. Similarly, the data module 58*b* may further comprise a first frequency count data structure 76 a second frequency count data structure 78, a third frequency count data structure 88, and operand frequency count data structure(s) 90, which are associated with a second routine of the uncompressed program 54. The first frequency count data structure 76 and the second frequency count data structure 78, which are associated with the second routine, may be implemented in software as a single data structure, as represented by the dashed box or as separate data structures. Although instruction/operand frequency count data structures are illustrated for only two routines in FIG. 5, it will be understood that the principles and concepts of the present invention may be extended to any number of routines comprising the uncompressed program 54. Finally, the data module 58*b* may comprise a "jump" address data structure 82, which may be implemented as discussed hereinabove with respect to the "jump" address data structure 66.

Although FIGS. 2, 4, and 5 illustrate an exemplary software architecture that may be used for compressing a computer program based on a compression criterion and executing the compressed computer program, it will be understood that the present invention is not limited to such a configuration but is intended to encompass any configuration capable of carrying out the operations described herein.

Computer program code for carrying out operations of the present invention may be written in an object-oriented programming language, such as Java, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage. Note that the uncompressed program 54 typically comprises machine or assembly code, which the compression program 52 analyzes and replaces instances of certain uncompressed instructions with compressed instructions to generate the compressed program 56, which, accordingly, also comprises machine or assembly code.

Figure 6:
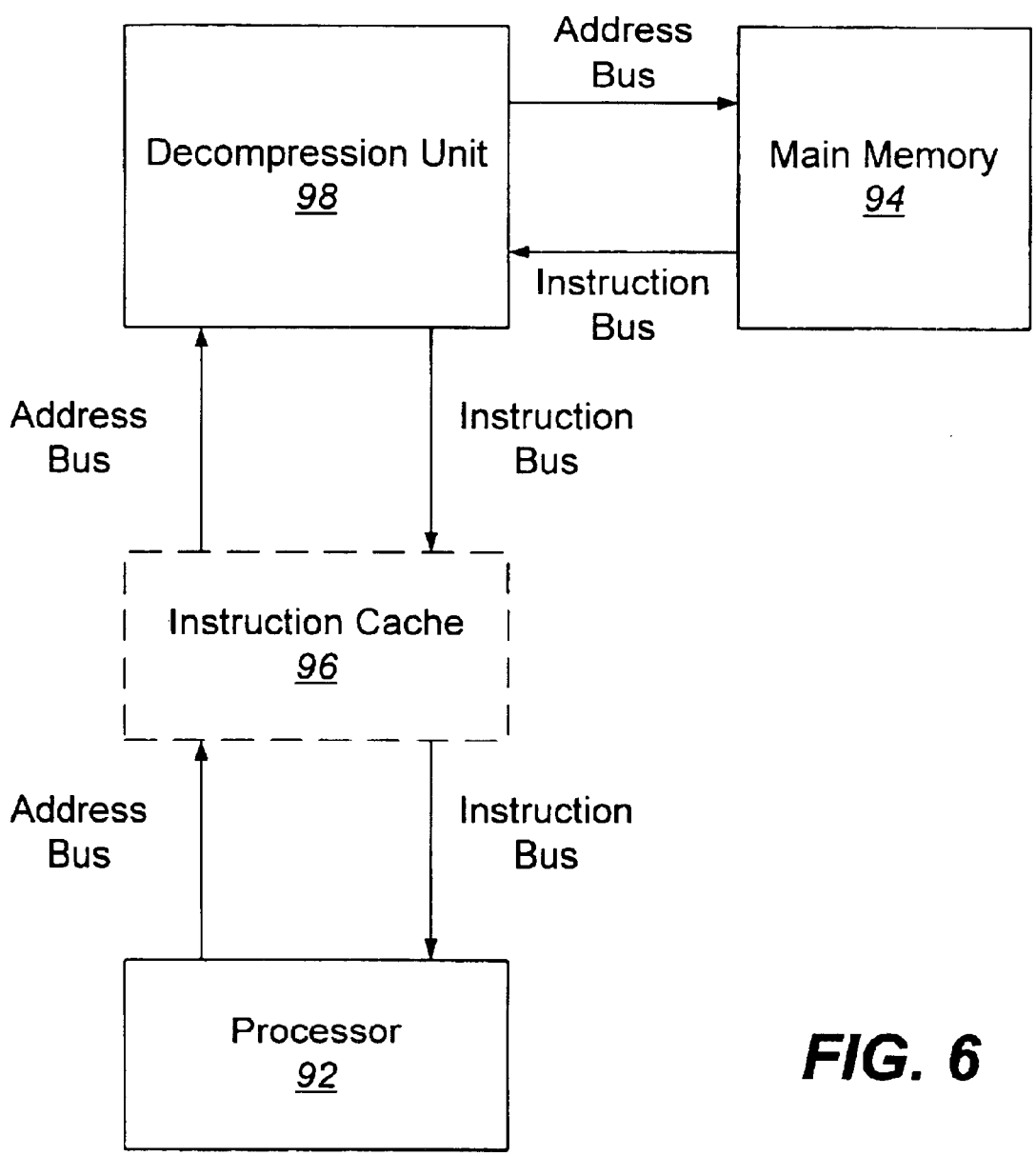
FIG. 6 is a high-level hardware architecture block diagram that illustrates methods, systems, and computer program products for compressing a computer program based on a compression criterion and executing the compressed program in accordance with embodiments of the present invention.

Referring now to FIG. 6, a hardware architecture that may be used in embodiments of methods, systems, and computer program products for compressing a computer program based on a compression criterion and executing the compressed program, in accordance with embodiments of the present invention, may include a processor 92, which is communicatively coupled to a main memory 94 via an instruction cache 96 and a decompression unit 98 using an address bus and an instruction bus. Note that the instruction cache 96 may be optional, but is often implemented to improve the hardware performance. The decompression unit 98 may be configured to allow the processor 92 to execute the compressed program 56 via decoding or decompression of the compressed instructions contained therein. An exemplary architecture of the decompression unit 98 will be described in detail hereinafter.

In accordance with embodiments of the present invention, the processor 92 and main memory 94 may represent the processor 42 and main memory 44 of FIG. 2. In this regard, the compressed program 56 may execute on the same processor that, along with the compression program 52, is used to generate the compressed program 56. Alternatively, the compression program 52 may be used to generate the compressed program 56 on a first processor 42 for execution on a different target processor 92.

Figure 7:
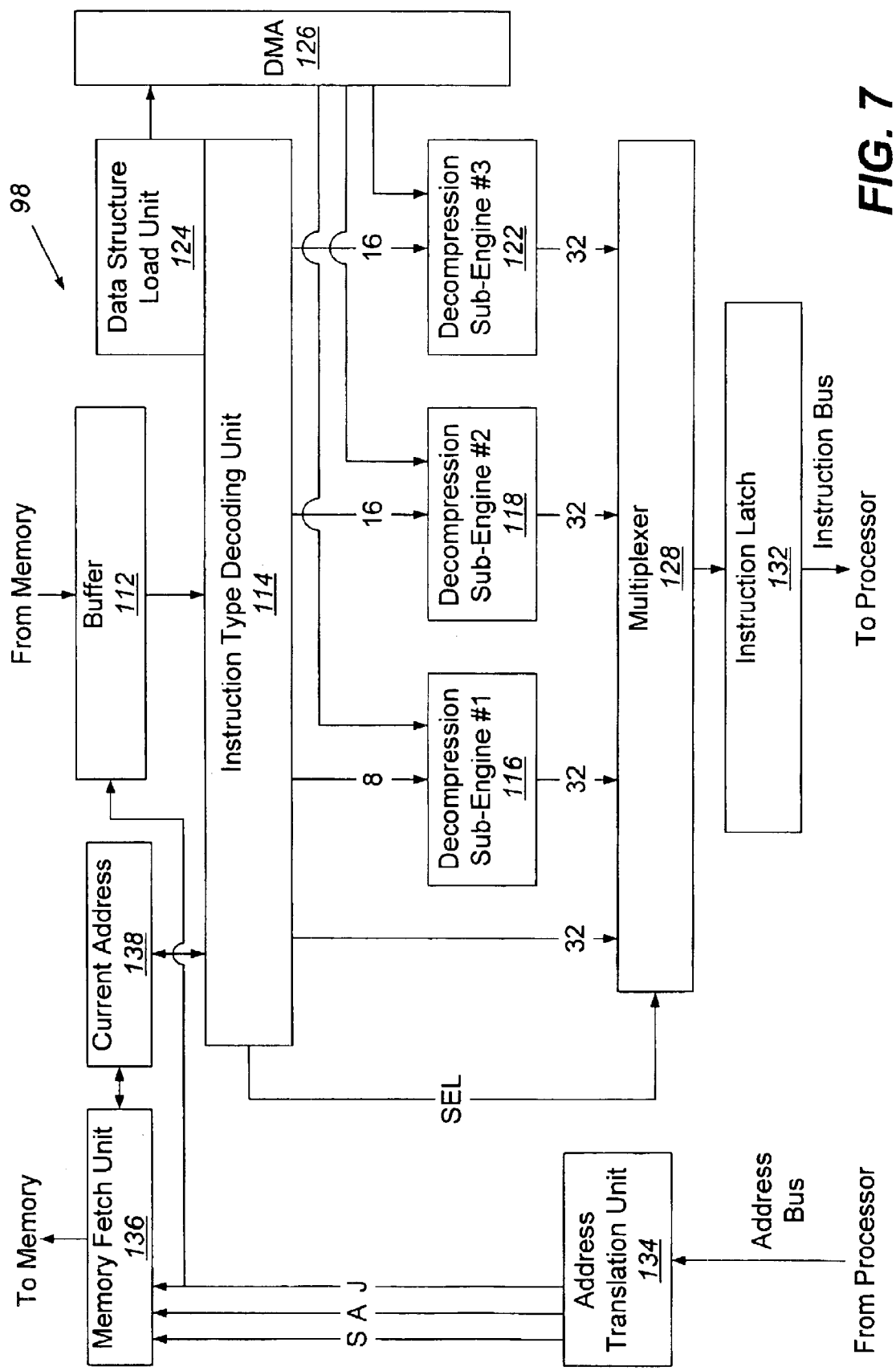
FIG. 7 is a more detailed hardware architecture block diagram of a decompression unit of FIG. 6 that illustrates methods, systems, and computer program products for compressing a computer program based on a compression criterion and executing the compressed program in accordance with embodiments of the present invention.

FIG. 7 is a more detailed hardware architecture block diagram of the decompression unit 98 of FIG. 6 in accordance with embodiments of the present invention. The decompression unit 98 may comprise a buffer 112, which may be implemented as a latch or register and has a data input that is communicatively coupled to the main memory 94 for receiving and storing one or more instructions therefrom. Preferably, the buffer 112 has a length of at least two uncompressed instructions. The buffer 112 has a data output that is coupled to a data input of an instruction type decoding unit 114, which may be configured to decode the instruction type field (e.g., the two high-order bits of the instruction; see FIGS. 3A–3D) of an instruction to determine whether the instruction is an uncompressed instruction, a Type I compressed instruction, a Type II compressed instruction, or a Type III compressed instruction.

As shown in FIG. 7, the decompression unit 98 may further comprise a decompression sub-engine #1 116, a decompression sub-engine #2 118, and a decompression sub-engine #3 122, each of which has a data input coupled to a respective data output of the instruction type decoding unit 114. The decompression sub-engines 116, 118, and 122 may be configured to decompress the Type I, Type II, and Type III compressed instruction types, respectively. Accordingly, the decompression sub-engine #1 116 may have an 8-bit wide interface with the instruction type decoding unit 114 and the decompression sub-engines #2, #3, 118 and, 122 may have 16-bit wide interfaces with the instruction type decoding unit 114.

To facilitate decompression of the compressed instructions, the instruction type decoding unit 114 may include a data structure load unit 124 that is configured to detect a data structure load instruction. In accordance with embodiments of the present invention, upon detecting the data structure load instruction, the data structure load unit 124 may cooperate with a direct memory access (DMA) unit 126 to download the first frequency count data structure 62 (see FIG. 4) to the decompression sub-engine #1 116, and/or the second frequency count data structure 64 (see FIG. 4) to the decompression sub-engine #2 118, and/or the third frequency count data structure 68 and operand frequency count data structure(s) 70 (see FIG. 4) to the decompression sub-engine #3 122. In accordance with alternative embodiments of the present invention, the data structure load unit 124 may cooperate with the DMA unit 126 to download the first frequency count data structures 72 and 76 (see FIG. 5) that are associated with the first and second routines, respectively, to the decompression sub-engine #1 116, the second frequency count data structures 74 and 78 (see FIG. 5) that are associated with the first and second routines, respectively, to the decompression sub-engine #2 118, the third frequency count data structures 84 and 88 (see FIG. 5) that are associated with the first and second routines, respectively, to the decompression sub-engine #3 122, and the operand frequency count data structure(s) 86 and 90 (see FIG. 5) that are associated with the first and second routines, respectively, to the decompression sub-engine #3 122.

The instruction type decoding unit 114 may further include a fourth data output that is coupled to a data input of a multiplexer 128. This interface between the instruction type decoding unit 114 and the multiplexer 128 is 32 bits wide for transferring uncompressed instructions directly from the instruction type decoding unit 114 to the multiplexer 128. Respective data outputs on the decompression sub-engines 116, 118, and 122 are also coupled to respective data inputs on the multiplexer 128. The respective interfaces between the decompression sub-engines 116, 118, and 122 and the multiplexer 128 are 32 bits wide as the decompression sub-engines 116, 118, and 122 generate an uncompressed instruction at their respective data outputs in response to a compressed instruction received at their respective data inputs. The instruction type decoding unit 114 generates a select signal SEL, which is received by the multiplexer 128 and controls which input to the multiplexer 128 is to be selected for output. The select signal may be, for example, 2 bits wide to select which one of the four 32 bit data inputs is to be output to the instruction latch 132.

The processor views the instructions contained in the main memory 94 as a series of uncompressed (e.g., 32 bit) instructions, but the instructions in the main memory may comprise both compressed (e.g., Types I, II, and III) instructions and uncompressed instructions; therefore, an address translation unit 134 may be used to translate an instruction address generated by the processor to the address of the corresponding instruction in the main memory 94. In particular, the address translation unit 134 may determine whether the current instruction address requested by the address translation unit 134 is a sequential address or whether the instruction represents a transfer of control (e.g., a "jump," "goto," or "branch" instruction). For example, in exemplary embodiments of the present invention in which 32-bit uncompressed instructions are used, the address translation unit 134 may subtract the instruction address of a previous instruction from a current instruction to determine if the difference is four bytes or 32 bits. If the difference between consecutive instruction addresses from the processor is four bytes, then the address translation unit 134 may generate a sequential signal (S) at an output thereof, which is provided to a memory fetch unit 136. The memory fetch unit 136 may then fetch one or more instructions at the next consecutive address in the main memory 94 based on a current address pointer, which is stored in a current address register 138. That is, as instructions are decoded by the instruction type decoding unit 114, the buffer 112 is shifted by an amount corresponding to the length of the decoded instruction to remove the decoded instruction from the buffer 112. Accordingly, the buffer 112 preferably has a length that is capable of holding at least two uncompressed instructions to allow fetched instructions to be stored in the buffer 112 and shifted into position for processing by the instruction type decoding unit 114. The current address register 138 is communicatively coupled to both the memory fetch unit 136 and the instruction type decoding unit 114 and is used to hold a current address pointer or program counter that is based on the compressed program 56 (see FIG. 2) in the main memory 94.

If, however, the difference between consecutive instruction addresses is more than four bytes, then the address translation unit 134 may interpret the current instruction address from the processor as a transfer of control (e.g., a "jump," "goto," or "branch" instruction). In this case, the address translation unit 134 may generate a jump signal (J) at an output thereof along with an address (A) at another output thereof, which specifies where in the main memory execution of the compressed program 56 should continue. Note that the jump signal (J) is also provided to the buffer 112 as a transfer of control results in the buffer being reset or cleared to allow one or more instructions located at the jump address (A) to be loaded from the main memory 94.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 8:
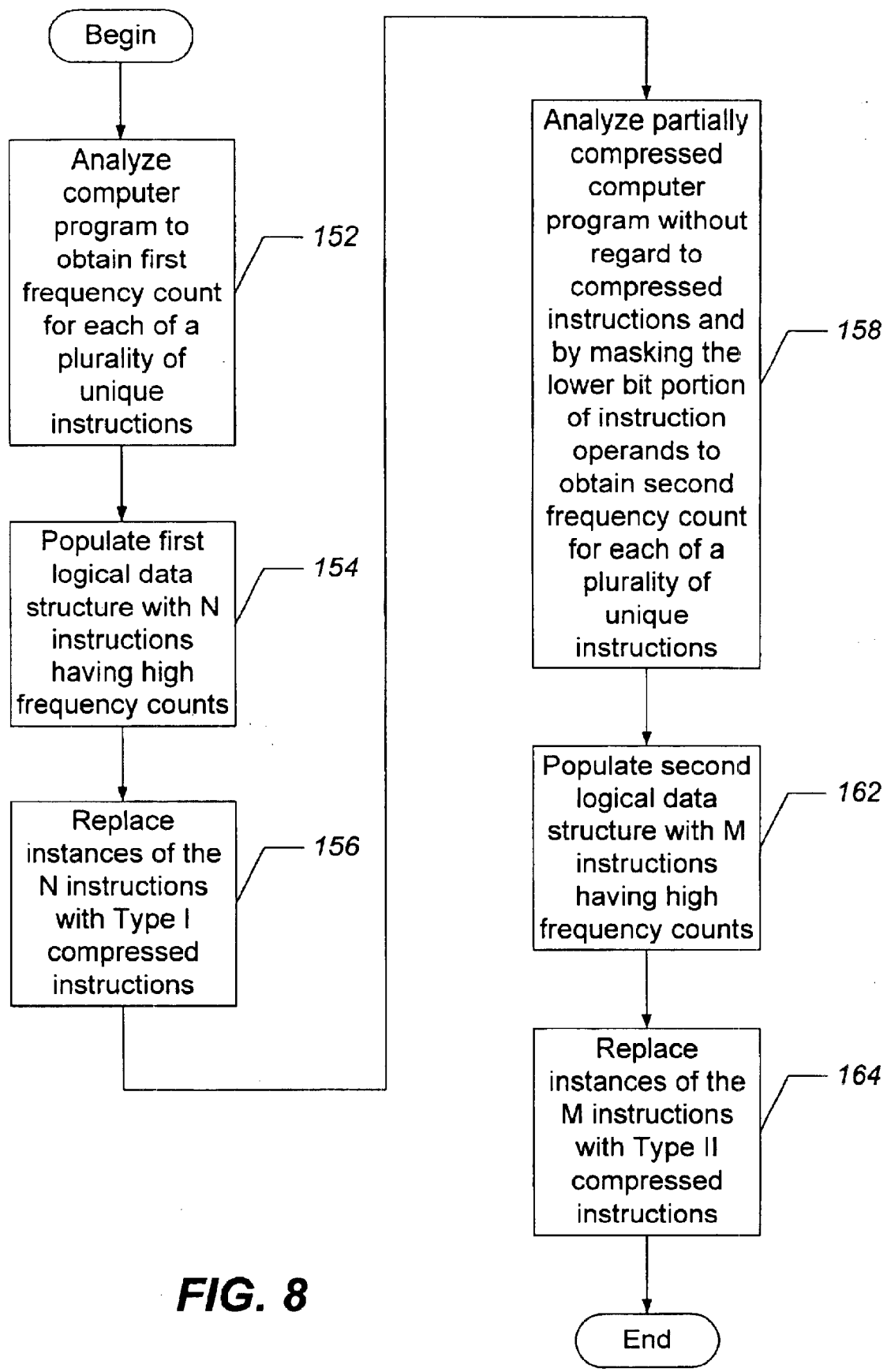

With reference to the flowcharts of FIGS. 8–16 and the architectural block diagrams of FIGS. 2, and 4–6, exemplary operations of methods, systems, and computer program products for compressing a computer program based on a compression criterion and executing the compressed program, in accordance with embodiments of the present invention, will be described hereafter. Referring now to FIG. 8, computer program compression operations begin at block 152 where the compression program 52 may scan or analyze an uncompressed program 54 to obtain a first frequency count for each of a plurality of unique instructions that comprise the uncompressed program 54. Next, at block 154, the compression program 52 may populate the first frequency count data structure 62 with the N uncompressed instructions in the uncompressed program 54 that are determined to have high frequency counts. These N uncompressed instructions may be the N instructions with the highest frequency counts. Alternatively, even if an instruction has a high frequency of use, it may be desirable to maintain a high execution speed for that instruction (i.e., to avoid the steps of uncompression during execution). Therefore, the N instructions stored in the first frequency count data structure 62 may not necessarily be the N instructions with the highest frequency of use.

In accordance with exemplary embodiments of the present invention, the compression program 52, at block 156, may replace instances of these N instructions in the uncompressed program 54 with Type I compressed instructions, shown in FIG. 3B, to generate the compressed program 56.

To further improve memory utilization, the compression program 52 may, at block 158, scan or analyze the partially compressed program 56 after instances of the N uncompressed instructions have been replaced by the Type I compressed instructions. Moreover, the analysis may be performed without regard to the Type I compressed instructions and by masking the lower bit portion of instruction operands to obtain a second frequency count for each of a plurality of unique instructions comprising the partially compressed program 56. This analysis may identify those instructions that are frequently used, but differ only as a result of particular operand data. Next, at block 162, the compression program 52 may populate the second frequency count data structure 64 with the M uncompressed instructions in the partially compressed program 56 that are determined to have high frequency counts. These M uncompressed instructions may be the M instructions with the highest frequency counts. Alternatively, as discussed hereinabove, even if an instruction has a high frequency of use, it may be desirable to maintain a high execution speed for that instruction (i.e., avoid the steps of uncompression during execution). Therefore, the M instructions stored in the second frequency count data structure 64 may not necessarily be the M instructions with the highest frequency of use.

Finally, in accordance with exemplary embodiments of the present invention, the compression program 52, at block 164, may replace instances of these M instructions in the partially compressed program 56 with Type II compressed instructions, shown in FIG. 3C, to generate the compressed program 56.

Figure 9:
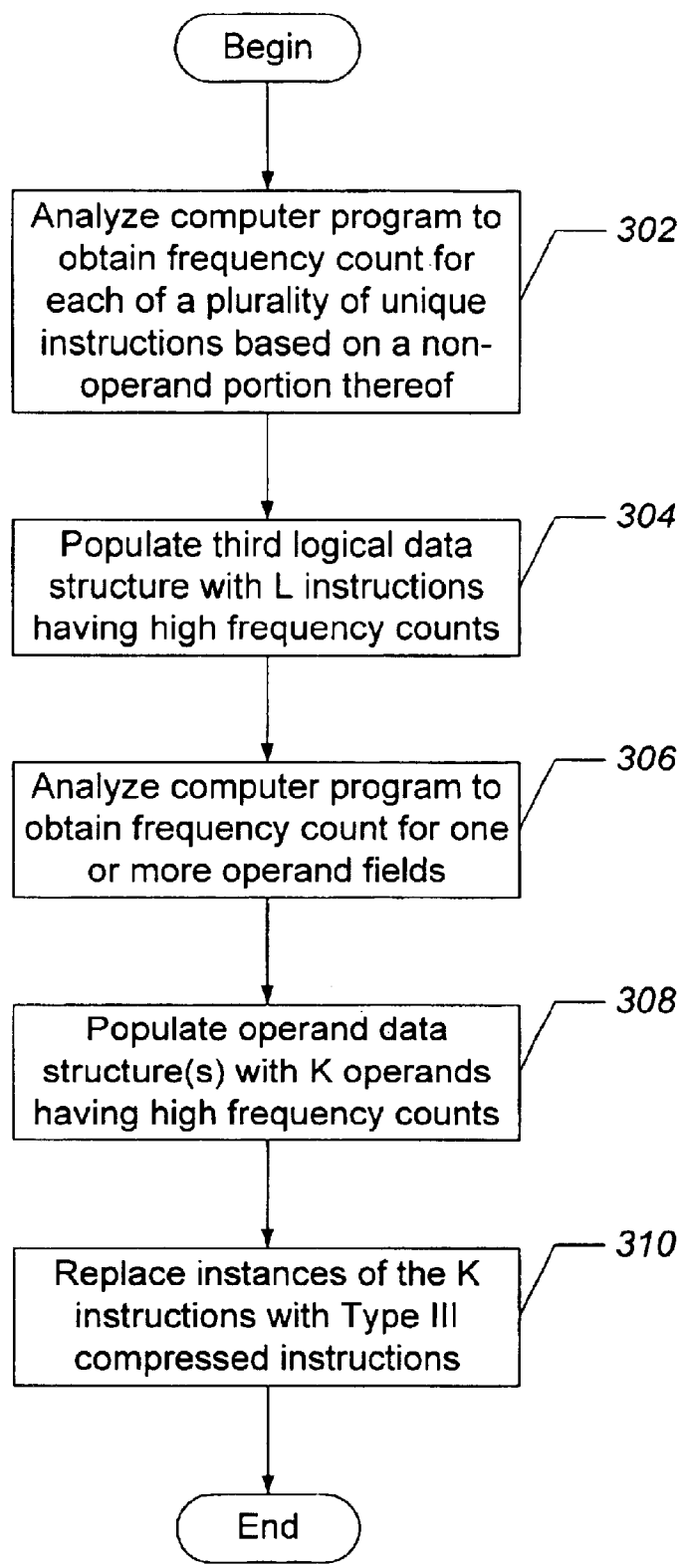

Further embodiments of the present invention are illustrated in FIG. 9. At block 302, the compression program 52 may scan or analyze the uncompressed program 54 to obtain a frequency count for each of a plurality of unique instructions that comprise the uncompressed program 54 based on a non-operand portion thereof. Next, at block 304, the compression program 52 may populate the third frequency count data structure 68 with the L uncompressed instructions in the uncompressed program 54 that are determined to have high frequency counts. These L uncompressed instructions may be the L instructions with the highest frequency counts. Alternatively, as discussed hereinabove, even if an instruction has a high frequency of use, it may be desirable to maintain a high execution speed for that instruction (i.e., to avoid the steps of uncompression during execution). Therefore, the L instructions stored in the third frequency count data structure 68 may not necessarily be the L instructions with the highest frequency of use.

At block 306, the compression program 52 may scan or analyze the uncompressed program 54 to obtain frequency counts for each of a plurality of unique operands in one or more operand fields. The compression program 52 may then, at block 308, populate one or more operand data structure(s) 70 with the K operands that are determined to have high frequency counts in the respective operand fields. In accordance with exemplary embodiments of the present invention, the compression program 52, at block 310, may replace instances of the aforementioned L instructions in the uncompressed program 54 with Type III compressed instructions, shown in FIG. 3D, to generate the compressed program 56.

In accordance with the present invention, by replacing more frequently used instructions in a program with shorter instructions, memory resources may be conserved. Advantageously, the present invention may allow for a balance between memory conservation and program execution speed. For example, by increasing the number of instructions that are replaced by compressed instructions (i.e., by increasing the numbers N and/or M), memory conservation may be improved, but typically at the expense of a reduced program execution speed. Note that program execution speed may be impacted because executing a compressed instruction involves an additional step of translating the compressed instruction into an uncompressed instruction for execution by a processor. Accordingly, execution of compressed instructions may, in general, be slower than execution of uncompressed instructions. If only a modest improvement in memory conservation is desired, however, then fewer instructions may be replaced by compressed instructions, which may lessen the impact on program execution speed. Furthermore, in accordance with the present invention, instruction execution speed may be used in addition to or in lieu of instruction frequency of use as a compression criterion. That is, instructions that preferably have a high execution speed may not be selected for compression.

Referring now to FIG. 10, in accordance with further embodiments of the present invention, the compression program 52 may identify one or more addresses that are referenced in the uncompressed program 54 and are used by instructions that transfer control (e.g., jump instructions, goto instructions, branch instructions, and the like) at block 166. As illustrated in FIG. 11, at block 168, the compression program 52 may calculate new addresses for the instructions comprising the compressed program 56 after replacing certain uncompressed instructions with compressed instructions as discussed hereinabove with respect to FIGS. 8 and 9. If any of the addresses that are referenced or used by instructions that transfer control (i.e., "jump" addresses) has changed as determined at block 172, then the compression program 56 may update each "jump" address that has changed at block 174 with the calculated address from block 168 that corresponds thereto.

Figure 12:
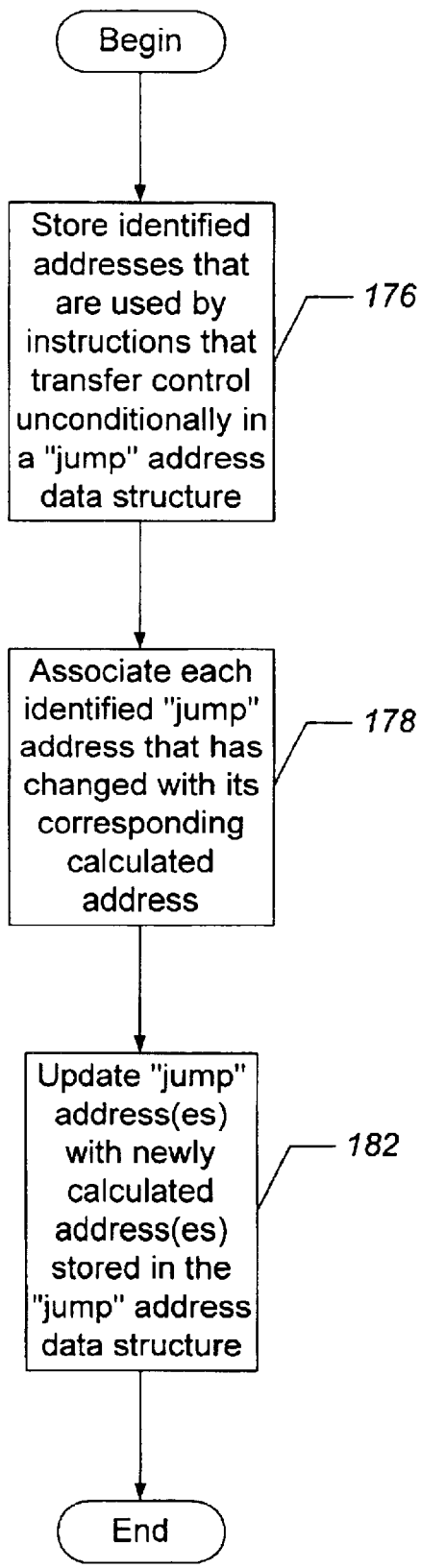

Referring now to FIG. 12, particular embodiments of the present invention are illustrated for updating "jump" addresses that have changed as a result of replacing uncompressed instructions with compressed instructions. At block 176, the compression program 52 may store the addresses that are identified at block 166 of FIG. 10 as being used by instructions that transfer control in the "jump" address data structure 66. Next, at block 178, the compression program 52 may associate each "jump" address that has changed as a result of replacing uncompressed instructions with compressed instructions as determined at block 172 with the calculated address from block 168 of FIG. 11 that corresponds thereto. Finally, at block 182, the compression program 56 may update each "jump" address that has changed with a newly calculated address that is associated therewith in the "jump" address data structure 66.

Referring now to FIG. 13, alternative embodiments of the present invention may involve replacing uncompressed instructions in the uncompressed program 54 through analysis of individual routines comprising the uncompressed program 54. Operations begin at block 192 where the compression program 52 may scan or analyze an uncompressed program 54 to obtain respective first frequency counts for each of a plurality of unique instructions in one or more routines that comprise the uncompressed program 54. Next, at block 194, the compression program 52 may populate respective first frequency count data structures 72, 76, etc. with the N uncompressed instructions in each of the one or more routines that are determined to have high frequency counts (e.g., the N instructions that have the highest frequency counts). In accordance with exemplary embodiments of the present invention, the compression program 52, at block 196, may replace instances of these N instructions in the one or more routines with Type I compressed instructions, shown in FIG. 3B, to generate the compressed program 56.

In accordance with further embodiments of the present invention illustrated in FIG. 14, the compression program 52 may, at block 198, scan or analyze the partially compressed program 56 after instances of N uncompressed instructions have been respectively replaced by Type I compressed instructions in each of the one or more routines. Moreover, the analysis may be performed without regard to the Type I compressed instructions and by masking the lower bit portion of instruction operands to obtain respective second frequency counts for each of a plurality of unique instructions in the one or more routines that comprise the partially compressed program 56. This analysis may identify those instructions that are frequently used, but differ only as a result of particular operand data. Next, at block 202, the compression program 52 may populate respective second frequency count data structures 74, 78, etc. with the M uncompressed instructions in each of the one or more routines that are determined to have high frequency counts (e.g., the M instructions that have the highest frequency counts). Finally, in accordance with exemplary embodiments of the present invention, the compression program 52, at block 204, may replace instances of these M instructions in the one or more routines with Type II compressed instructions, shown in FIG. 3C, to generate the compressed program 56.

Figure 15:
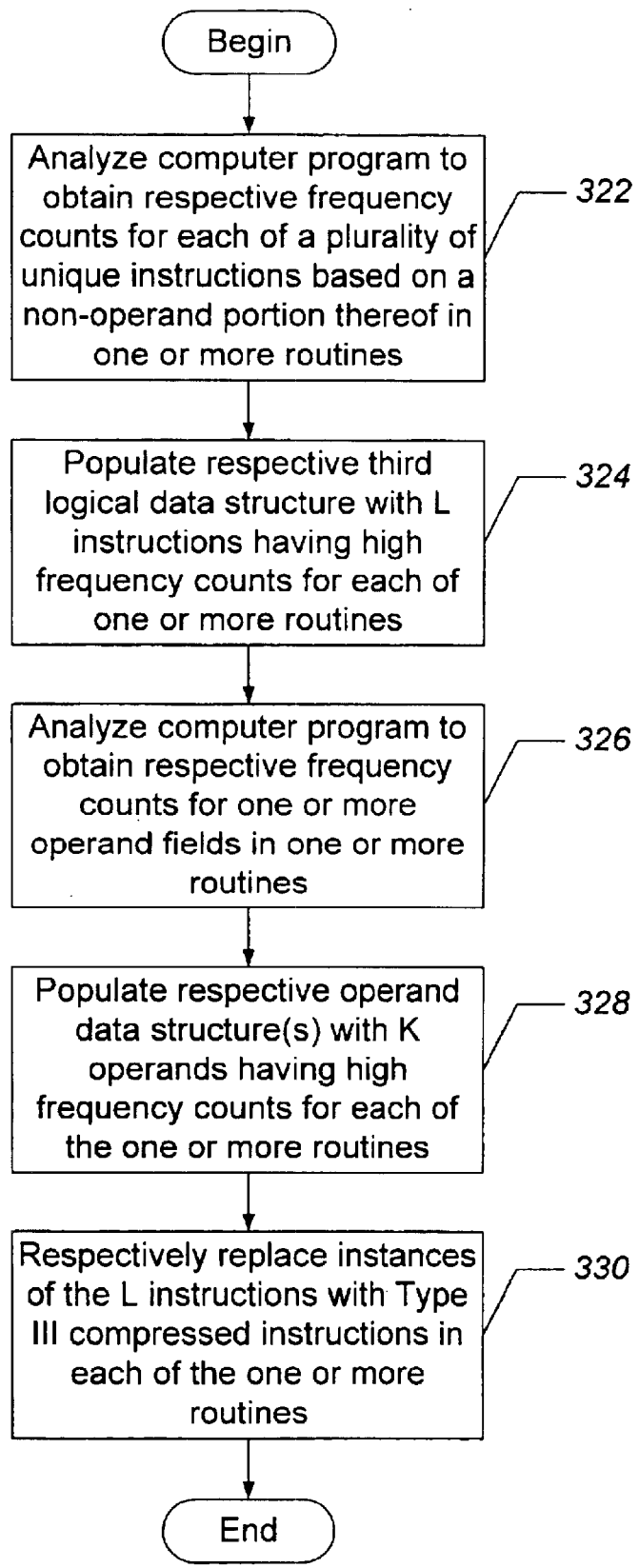

Further embodiments of the present invention involving the replacement of uncompressed instructions in the uncompressed program 54 through analysis of individual routines comprising the uncompressed program 54 are illustrated in FIG. 15. Operations begin at block 322 where the compression program 52 may scan or analyze the uncompressed program 54 to obtain respective frequency counts for each of a plurality of unique instructions based on a non-operand portion thereof in one or more routines that comprise the uncompressed program 54. Next, at block 324, the compression program 52 may populate respective third frequency count data structures 84, 88, etc. with the L uncompressed instructions in each of the one or more routines that are determined to have high frequency counts (e.g., the L instructions that have the highest frequency counts).

At block 326, the compression program 52 may scan or analyze the uncompressed program 54 to obtain respective frequency counts for each of a plurality of unique operands in one or more operand fields in one or more routines that comprise the uncompressed program 54. The compression program 52 may then, at block 328, populate respective operand data structure(s) 86, 90, etc. with the K operands in each of the one or more routines that are determined to have high frequency counts in the respective operand fields. In accordance with exemplary embodiments of the present invention, the compression program 52, at block 330, may replace instances of the aforementioned L instructions in the one or more routines with Type III compressed instructions, shown in FIG. 3D, to generate the compressed program 56.

By compressing the uncompressed program 54 on a per routine basis, a higher level of compression may be achieved in the compressed program 56 than would otherwise be achieved if the exemplary compression methodologies according to the present invention were applied to the uncompressed program 54 as a whole.

Figure 16A:
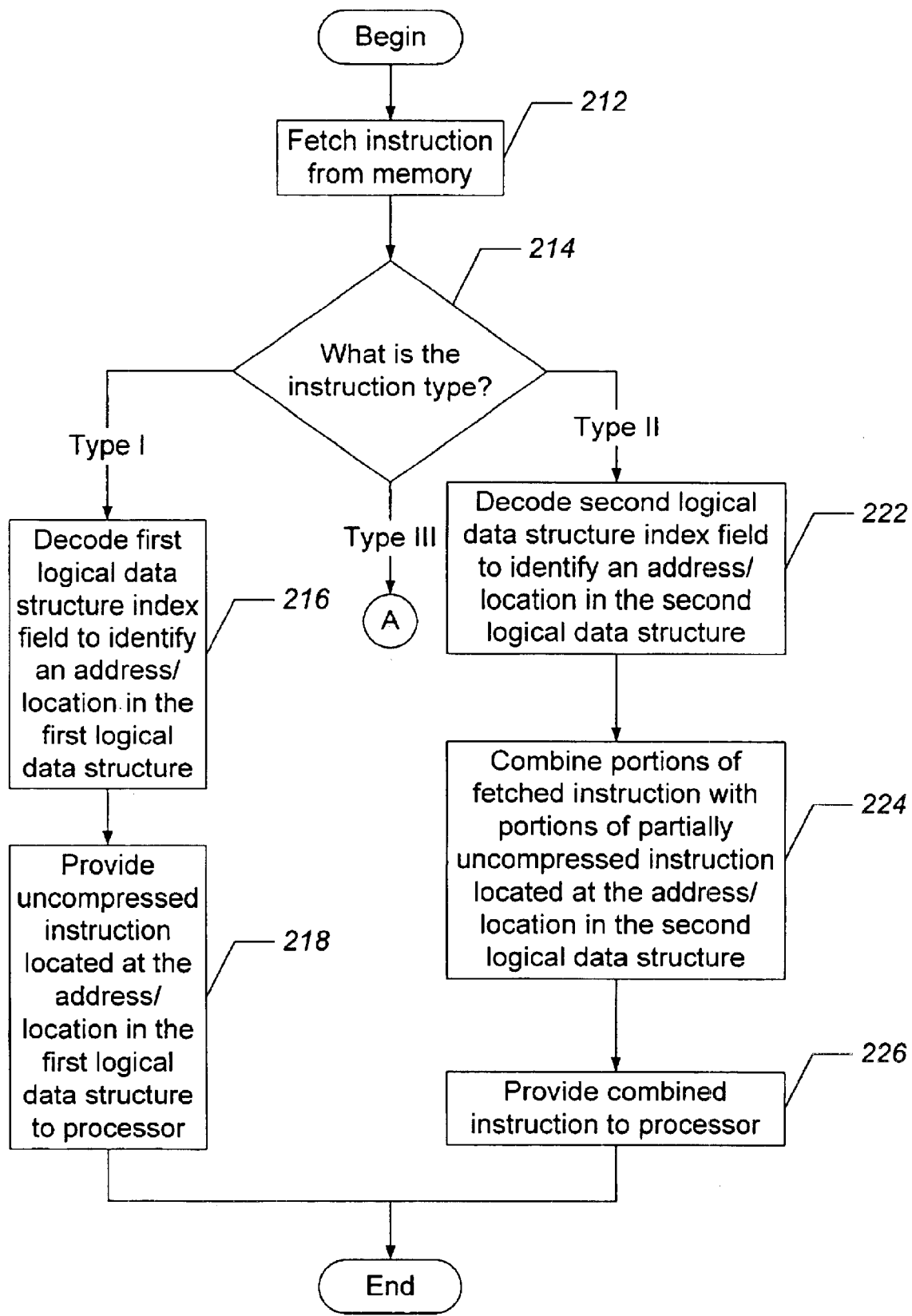
Figure 16B:
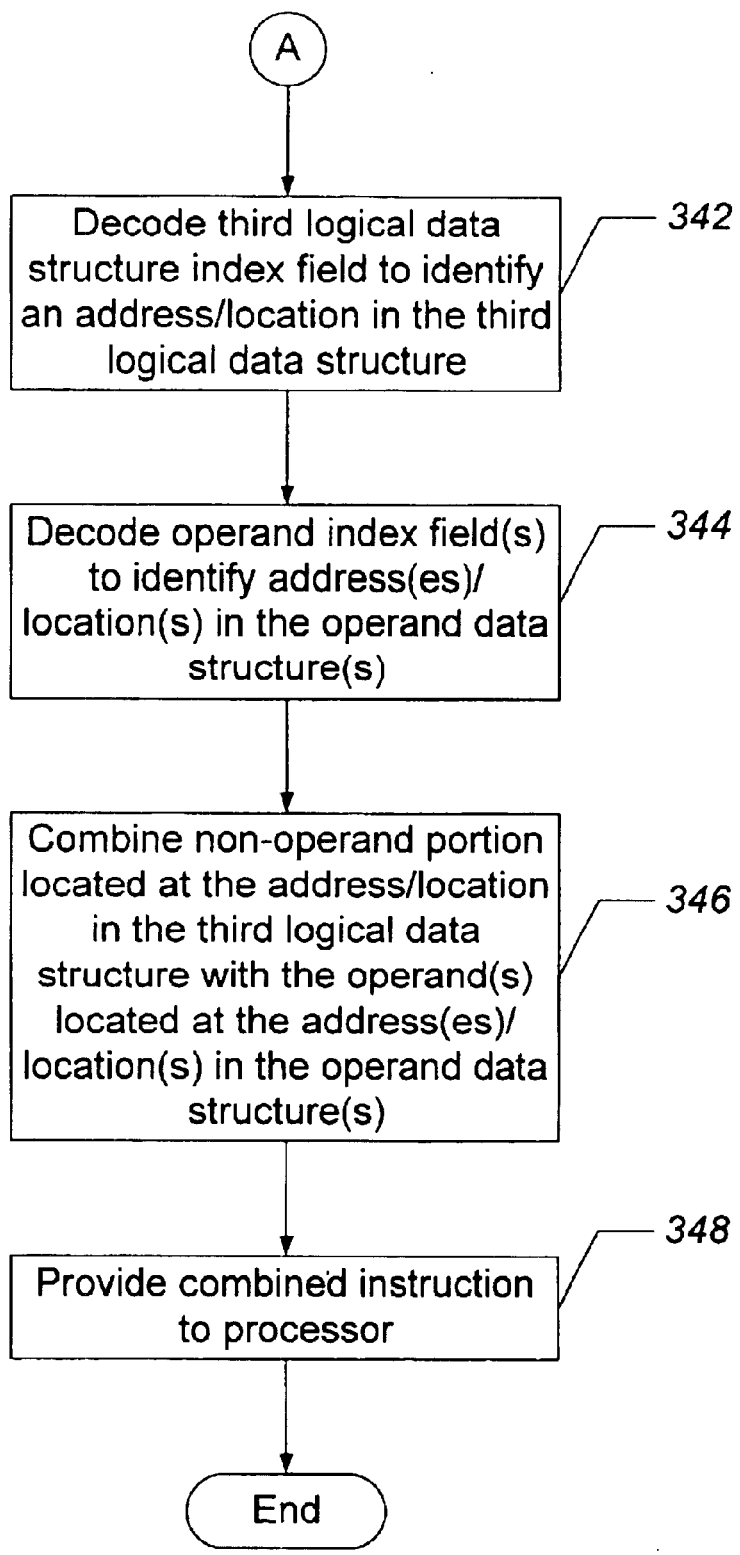

Referring now to FIG. 16A and with frequent reference to FIG. 7, exemplary operations for executing a compressed program, such as the compressed program 56, in accordance with embodiments of the present invention, will be described hereafter. Operations begin at block 212 where the memory fetch unit 136 fetches an instruction from the main memory 94 where it is loaded into the buffer 112. Next, at block 214, the instruction type decoding unit 114 decodes an instruction type field in the instruction to determine whether the fetched instruction is an uncompressed instruction, a Type I compressed instruction, a Type II compressed instruction, or a Type III compressed instruction. In accordance with exemplary embodiments of the present invention, the instruction type field may comprise the two high-order bits of the instruction as discussed hereinbefore with reference to FIGS. 3A–3D.

Figure 17:
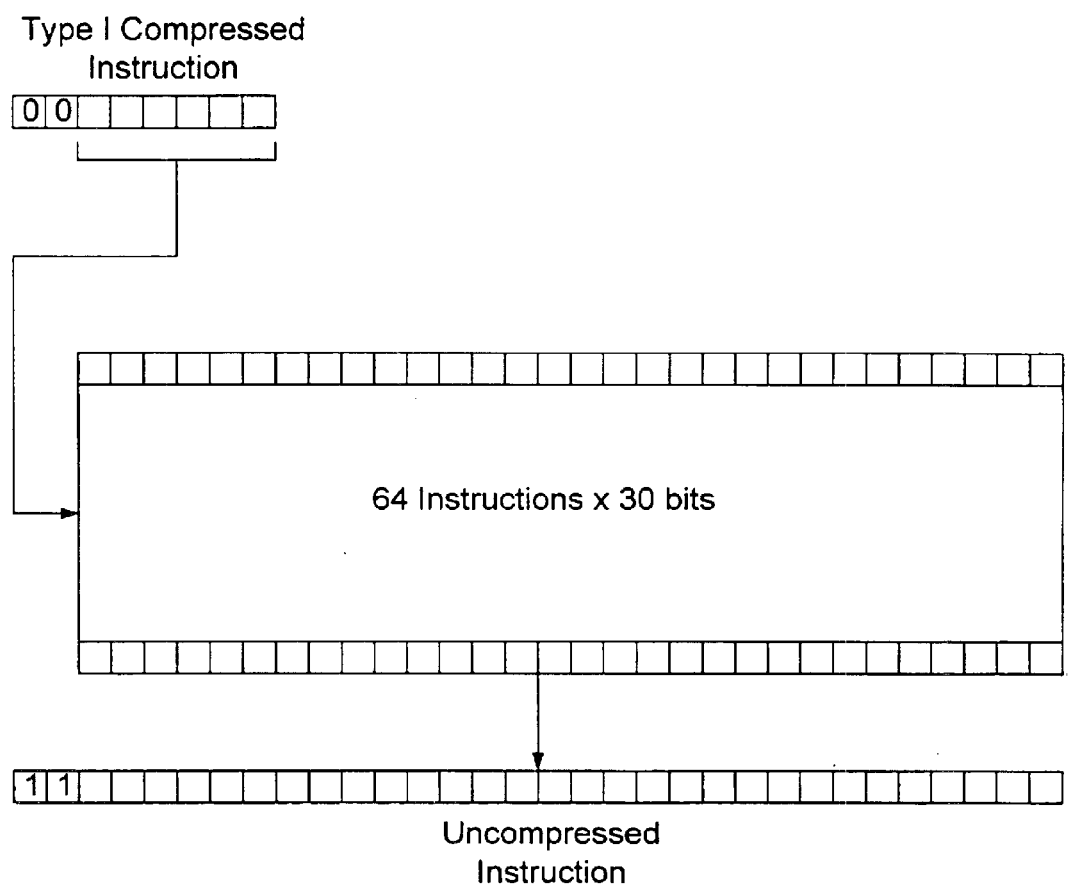
FIGS. 17–19 are block diagrams that illustrate logical associations between compressed instructions and uncompressed instructions via data structures in accordance with embodiments of the present invention.

If the instruction type decoding unit 114 determines that the fetched instruction is uncompressed, then the uncompressed instruction may be provided directly to the processor through the multiplexer 128. If, however, the fetched instruction is a Type I compressed instruction, then operations continue at block 216 where a first logical data structure index field may be decoded to identify an address or location in a first logical data structure. The first logical data structure may be implemented as the first frequency count data structure 62 of FIG. 4. The first logical data structure index may be implemented as the lower order six bits of a Type I compressed instruction. This is illustrated in FIG. 17 where the lower order six bits of a fetched Type I compressed instruction are used to index a table of 64 uncompressed instructions with each uncompressed instruction comprising 30 bits. Note that the uncompressed instructions may be stored as 30 bit words as the two high order bits designating the instructions as uncompressed need not be stored in the first frequency count data structure 62.

Returning to FIG. 16A, at block 218, the uncompressed instruction that is located at the address or location in the first logical data structure (e.g., the first frequency count data structure 62) that is specified by the lower order six bits of the Type I compressed instruction may then be provided to the processor for execution. Recall that the first frequency count data structure 62 may contain N uncompressed instructions. Accordingly, the first logical data structure index field may comprise $\log_2 N$ bits.

Figure 18:
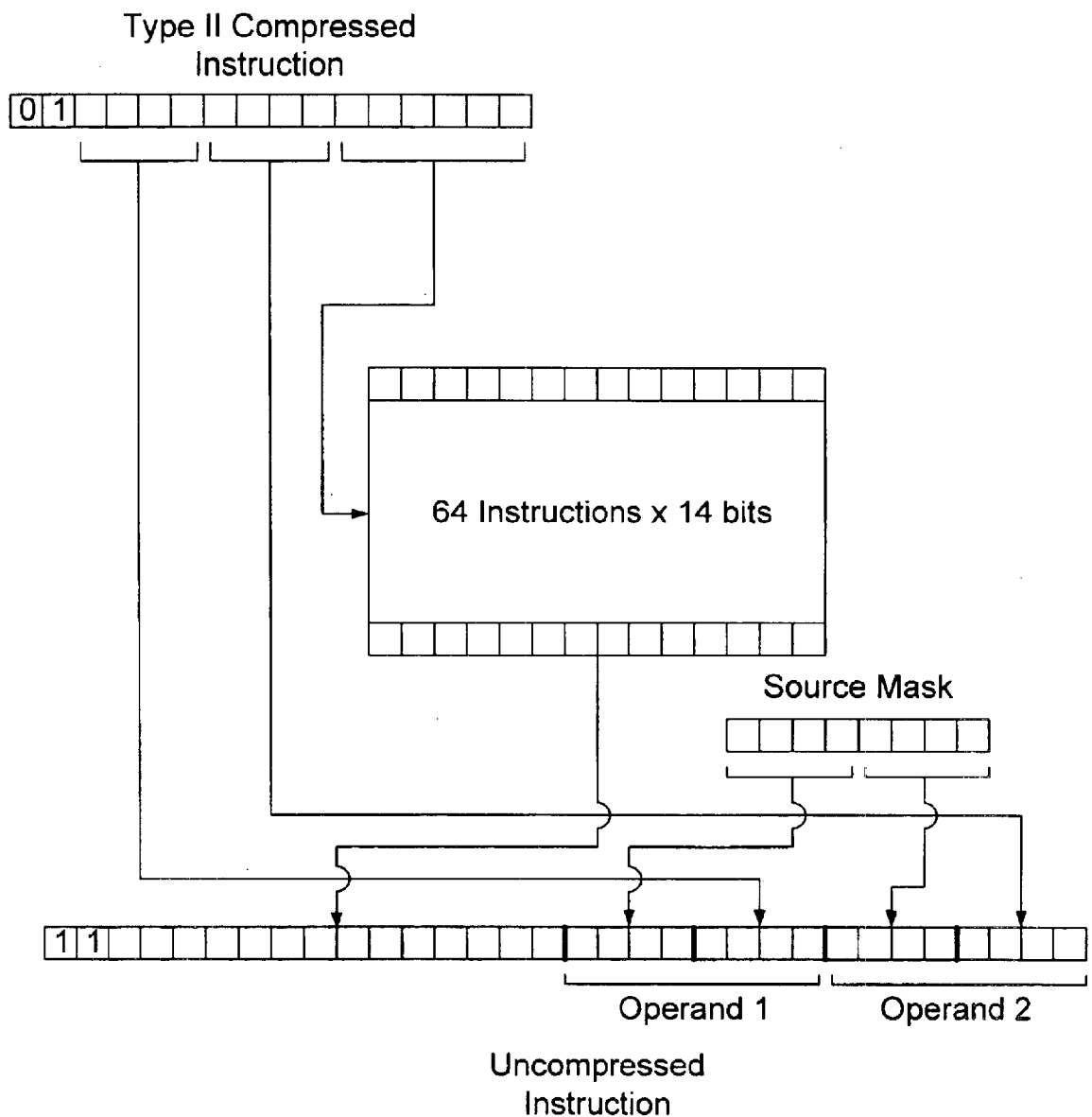

Returning to block 214 of FIG. 14, if the fetched instruction is a Type II compressed instruction, then operations continue at block 222 where a second logical data structure index field may be decoded to identify an address or location in a second logical data structure. The second logical data structure may be implemented as the second frequency count data structure 64 of FIG. 4. The second logical data structure index may be implemented as the lower order six bits of a Type II compressed instruction. This is illustrated in FIG. 18 where the lower order six bits of a fetched Type II compressed instruction are used to index a table of 64 uncompressed instructions with each uncompressed instruction comprising 14 bits. Note that the uncompressed instructions may be stored as 14 bit words as the two high order bits designating the instructions as Type II compressed instructions need not be stored in the second frequency count data structure 64. Moreover, in an exemplary embodiment of the present invention, the low order four bits of the operand data are masked when identifying uncompressed instructions from the uncompressed program 54 to be replaced by Type II compressed instructions. Accordingly, as shown in FIG. 18, the low order four bits from two operands are contained in a Type II compressed instruction and may be combined with the 14 bit uncompressed instructions contained in the second frequency count data structure 64. To complete the reconstruction of a complete 32 bit uncompressed instruction, a source mask may be used as shown in FIG. 18 to provide the upper four bits of each of the operands. The source mask may be implemented as a programmable register.

Returning to FIG. 16A, at block 224, the 14 bit uncompressed instruction that is located at the address or location in the second logical data structure (e.g., the second frequency count data structure 64) that is specified by the lower order six bits of the Type II compressed instruction may then be combined with portions of the Type II compressed instruction and the contents of the source mask to reconstruct the replaced uncompressed instruction as discussed in the foregoing. Finally, at block 226, the combined instruction or reconstructed uncompressed instruction may be provided to the processor for execution. Recall that the second frequency count data structure 64 may contain M uncompressed instructions. Accordingly, the second logical data structure index field may comprise $\log_2 M$ bits.

Figure 19:
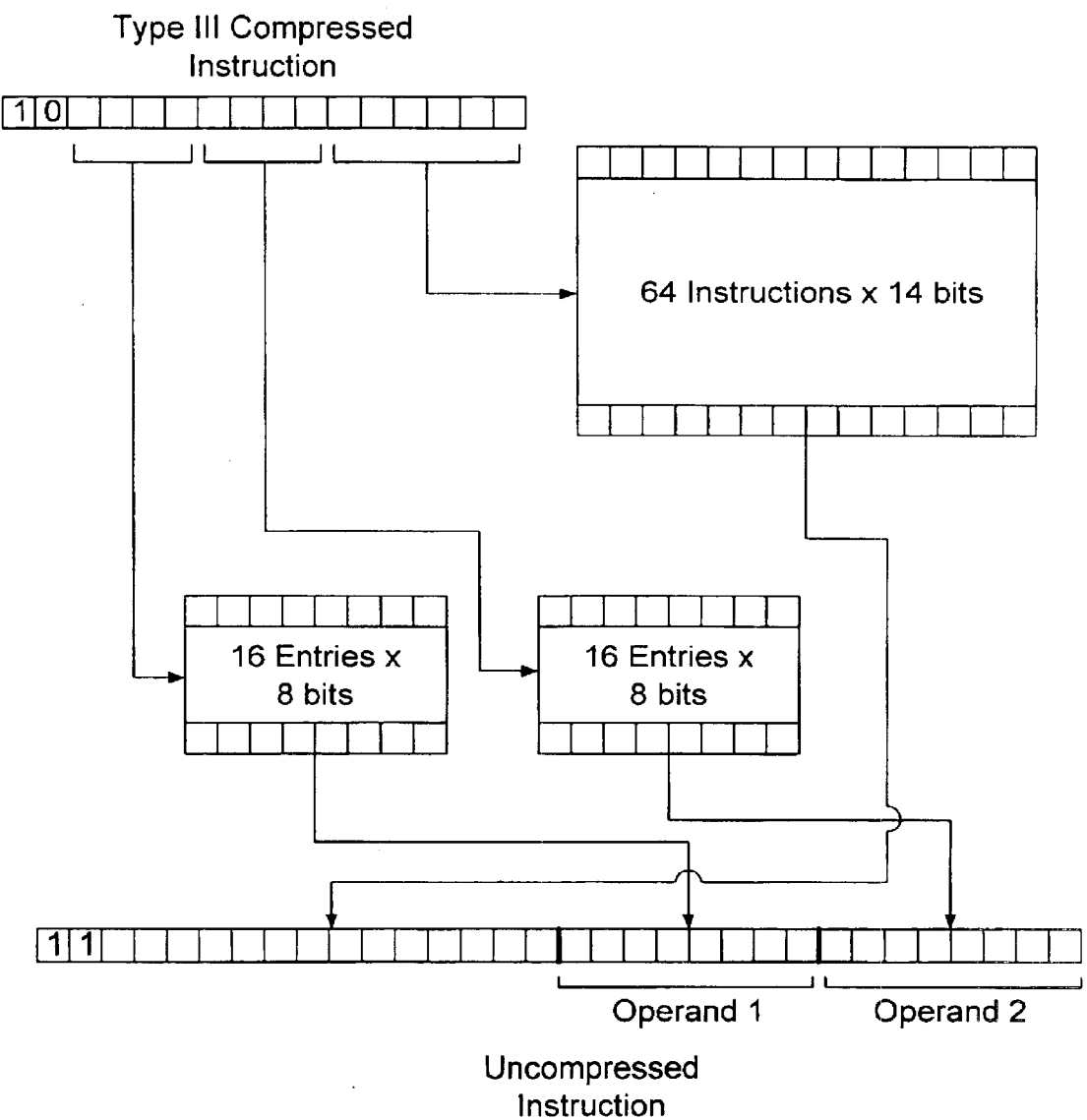

Returning to block 214 of FIG. 16A, if the fetched instruction is a Type III compressed instruction, then operations continue by following connector A to block 342 where a third logical data structure index field may be decoded to identify an address or location in a third logical data structure. The third logical data structure may be implemented as the third frequency count data structure 68 of FIG. 4. The third logical data structure index may be implemented as the lower order six bits of a Type III compressed instruction. This is illustrated in FIG. 19 where the lower order six bits of a fetched Type III compressed instruction are used to index a table of 64 uncompressed instructions with each uncompressed instruction comprising 14 bits. Note that the uncompressed instructions may be stored as 14 bit words as the two high order bits designating the instructions as Type III compressed instructions need not be stored in the third frequency count data structure 68.

At block 344, one or more operand index fields may be decoded to identify address(es) or location(s) in one or more operand data structures, respectively. The operand data structures may be implemented as the operand frequency count data structure(s) 70 of FIG. 4. The operand index fields may be implemented as the two, four bit fields between the instruction type field (two high order bits) and the third logical data structure index (six low order bits) as shown in FIG. 19. This is illustrated in FIG. 19 where two, four bit operand index fields are used to respectively index two tables containing 16, eight bit operands.

Returning to FIG. 16B, at block 346, the 14 bit uncompressed instruction that is located at the address or location in the third logical data structure (e.g., the third frequency count data structure 68) that is specified by the lower order six bits of the Type III compressed instruction may then be combined with one or more operands located at the addresses or locations in the one or more operand data structures (e.g., the operand frequency count data structure(s) 70) that is specified by the operand index fields to reconstruct the replaced uncompressed instruction. Finally, at block 348, the combined instruction or reconstructed uncompressed instruction may be provided to the processor for execution. Recall that the third frequency count data structure 68 may contain L uncompressed instructions and that the operand frequency count data structure(s) contain K operands. Accordingly, the second logical data structure index field may comprise $\log_2 M$ bits and the operand index fields may comprise $\log_2 K$ bits.

Figure 20:
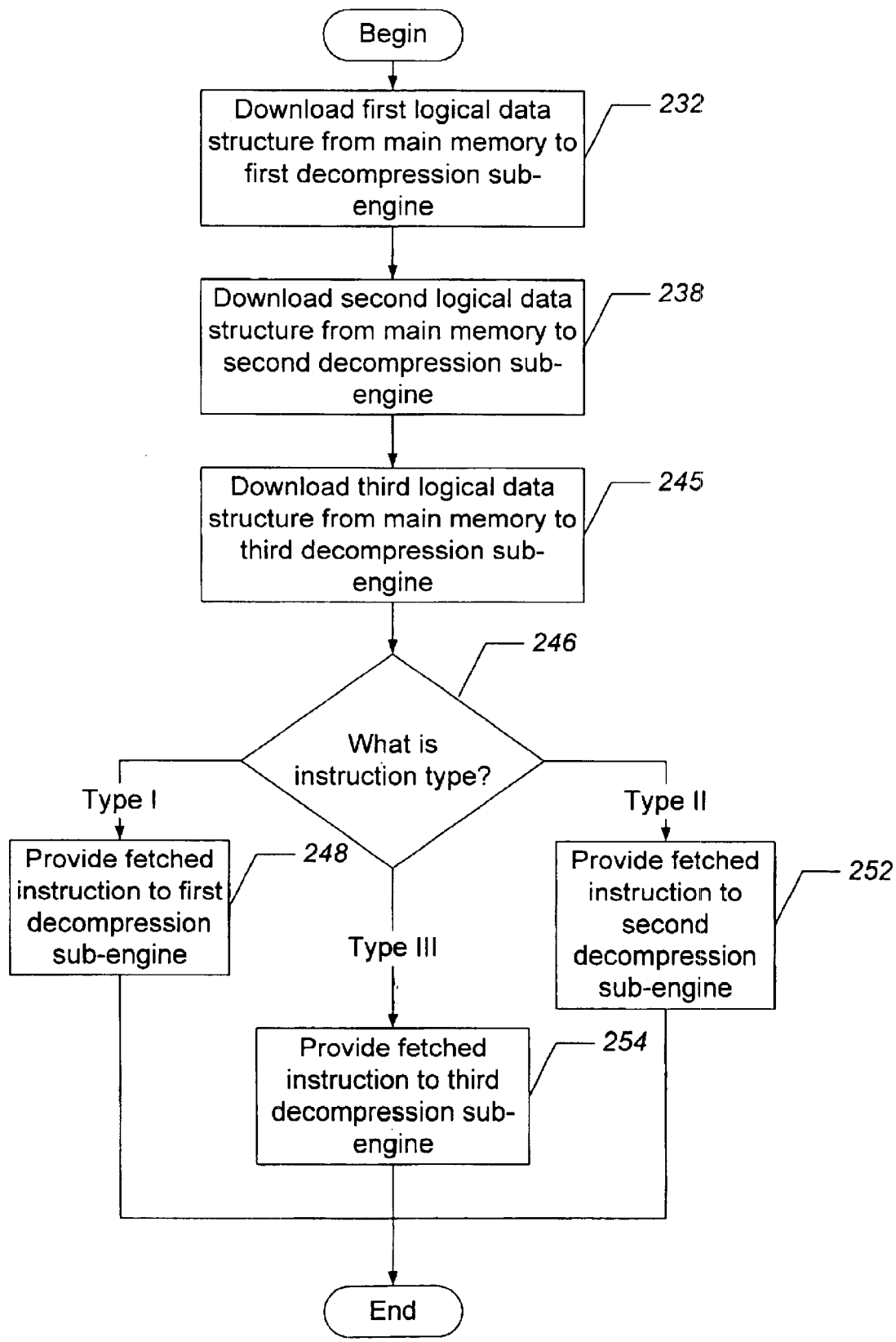
FIG. 20 is a flowchart that illustrates exemplary operations of methods, systems, and computer program products for compressing a computer program based on a compression criterion and executing the compressed program in accordance with embodiments of the present invention.
Figure 21:
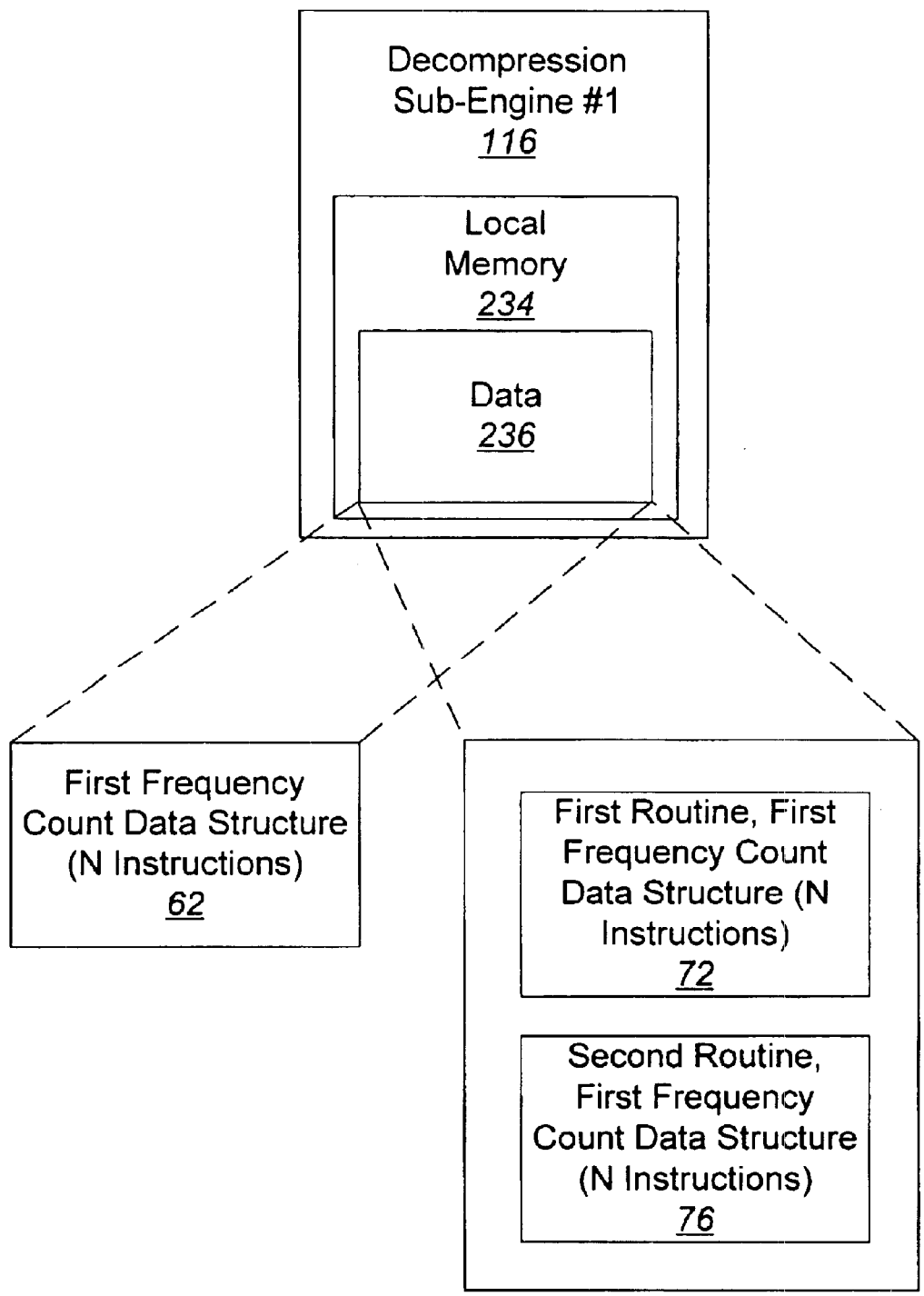
FIGS. 21–23 are block diagrams of first, second, and third decompression sub-engines of FIG. 7 that illustrate methods, systems, and computer program products for compressing a computer program based on a compression criterion and executing the compressed program in accordance with embodiments of the present invention.

Referring now to FIG. 20, in accordance with further embodiments of the present invention, the data structure load unit 124 may detect a data structure load instruction received by the instruction type decoding unit 114. Upon detecting the data structure load instruction, the data structure load unit 124 may cooperate with the DMA unit 126 to download the first logical data structure (e.g., first frequency count data structure 62) from the main memory 94 to the decompression sub-engine #1 116 at block 232. This operation is illustrated in FIG. 21 where the decompression sub-engine #1 116 is shown to comprise a local memory 234, which contains a data module 236. The data module 236 may comprise the first frequency count data structure 62. In accordance with alternative embodiments of the present invention, the first logical data structure that is downloaded from the main memory 94 to the decompression sub-engine #1 116 may comprise the first routine, first frequency count data structure 72, the second routine, first frequency count data structure 76 and/or any additional first frequency count data structures that have been defined for routines of the uncompressed program 54.

Figure 22:
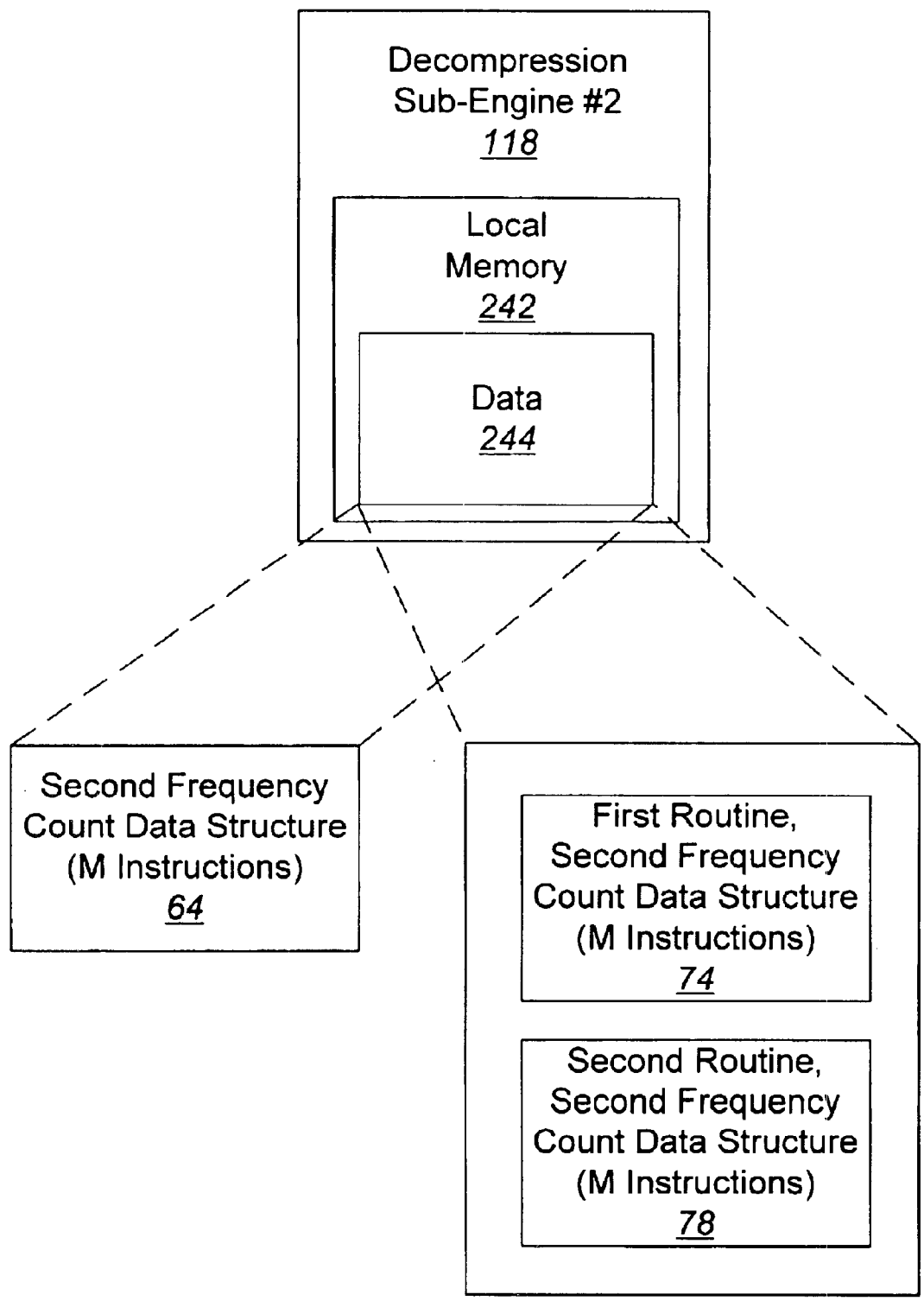

Returning to FIG. 20, upon detecting the data structure load instruction, the data structure load unit 124 may cooperate with the DMA unit 126 to download the second logical data structure (e.g., second frequency count data structure 64) from the main memory 94 to the decompression sub-engine #2 118 at block 238. This operation is illustrated in FIG. 22 where the decompression sub-engine #2 118 is shown to comprise a local memory 242, which contains a data module 244. The data module 244 may comprise the second frequency count data structure 64. In accordance with alternative embodiments of the present invention, the second logical data structure that is downloaded from the main memory 94 to the decompression sub-engine #2 118 may comprise the first routine, second frequency count data structure 74, the second routine, second frequency count data structure 78 and/or any additional second frequency count data structures that have been defined for routines of the uncompressed program 54.

Figure 23:
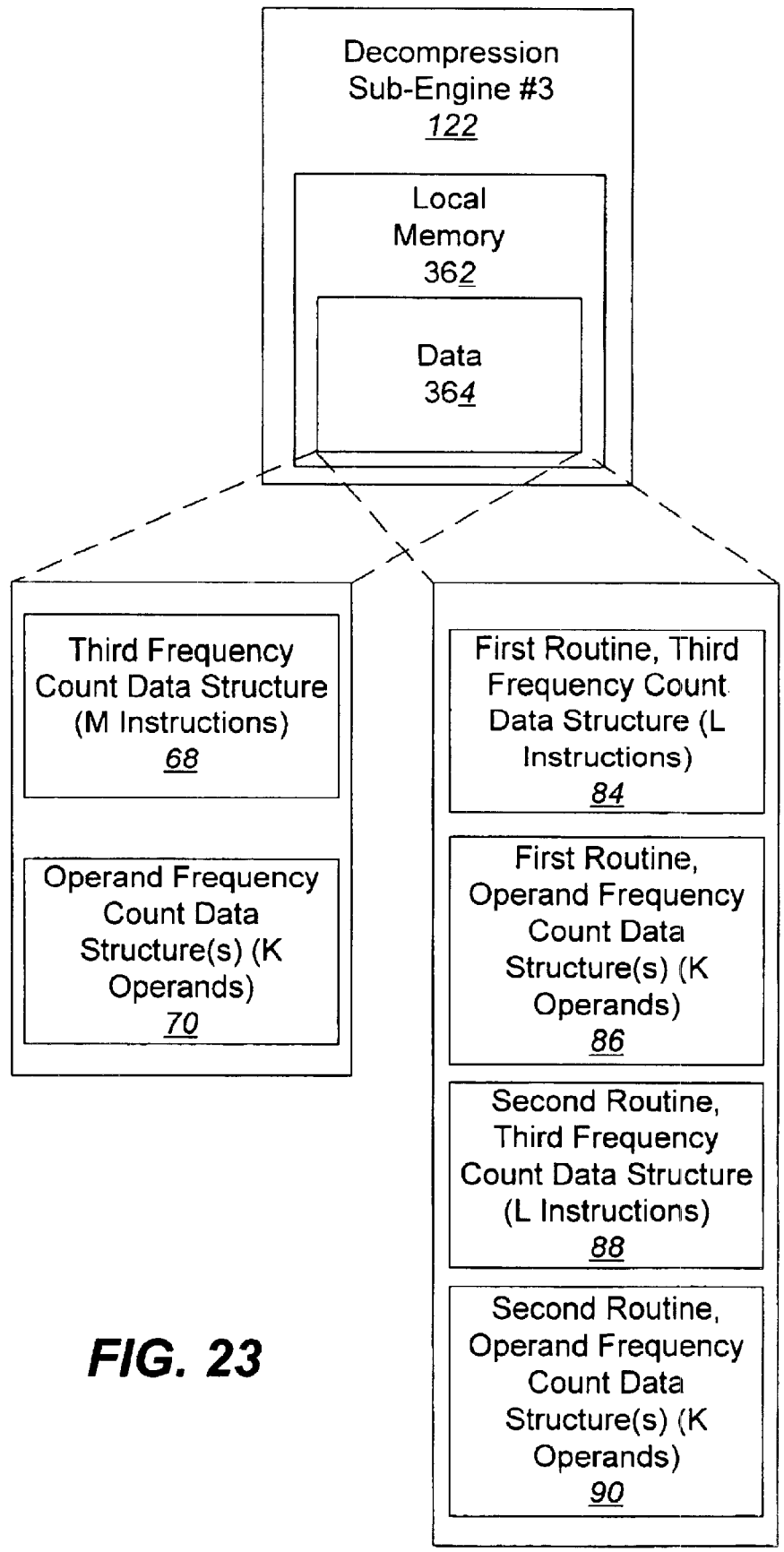

Returning to FIG. 20, upon detecting the data structure load instruction, the data structure load unit 124 may cooperate with the DMA unit 126 to download the third logical data structure (e.g., third frequency count data structure 68) and the operand frequency count data structure(s) 70 from the main memory 94 to the decompression sub-engine #3 122 at block 245. This operation is illustrated in FIG. 23 where the decompression sub-engine #3 122 is shown to comprise a local memory 362, which contains a data module 364. The data module 364 may comprise the third frequency count data structure 68 and the operand frequency count data structure(s) 70. In accordance with alternative embodiments of the present invention, the third logical data structure and operand data structure(s) that are downloaded from the main memory 94 to the decompression sub-engine #3 122 may comprise the first routine, third frequency count data structure 84, the second routine, third frequency count data structure 88, the first routine, operand frequency count data structure(s) 86, the second routine, operand frequency count data structure(s) 90 and/or any additional third frequency count data structures and operand frequency count data structures that have been defined for routines of the uncompressed program 54.

Thus, at block 246, the instruction type decoding unit 114 may determine the type of the fetched instruction. If the fetched instruction is a Type I compressed instruction, then the fetched instruction may be provided to the decompression sub-engine #1 116 at block 248. If the fetched instruction is a Type II compressed instruction, then the fetched instruction may be provided to the decompression sub-engine #2 118 at block 252. Alternatively, if the fetched instruction is a Type III compressed instruction, then the fetched instruction may be provided to the decompression sub-engine #3 122 at block 254.

Figure 24:
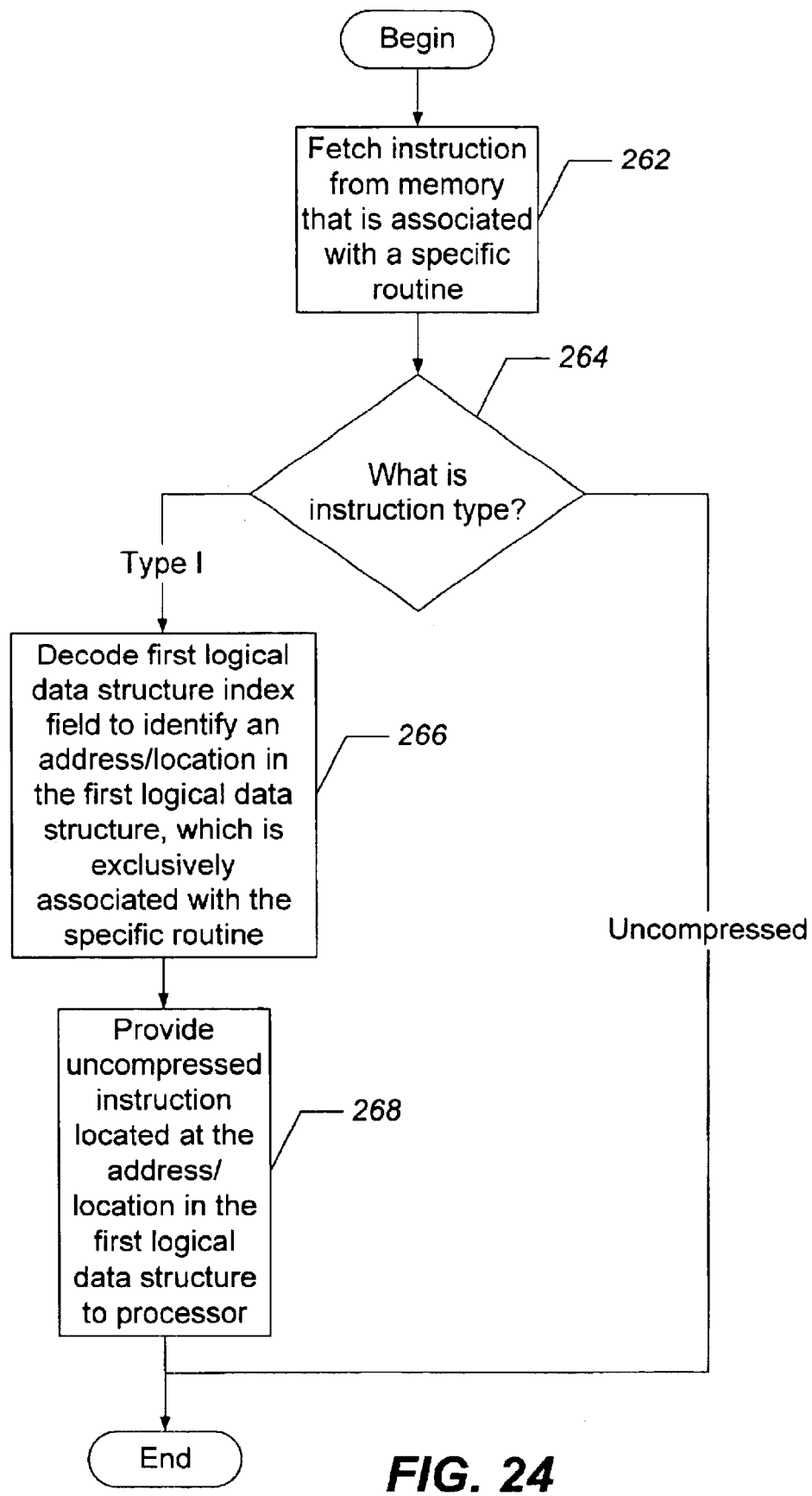
FIGS. 24–26 are flowcharts that illustrate exemplary operations of methods, systems, and computer program products for compressing a computer program based on a compression criterion and executing the compressed program in accordance with embodiments of the present invention.

Referring now to FIG. 24, exemplary operations for executing a compressed program, such as the compressed program 56, in accordance with alternative embodiments of the present invention, will be described hereafter. Operations begin at block 262 where the memory fetch unit 136 fetches an instruction that is associated with a specific one of a plurality of routines that comprise the compressed program 56. The instruction is then loaded into the buffer 112 and provided to the instruction type decoding unit 114, which determines the instruction type at block 264 as discussed hereinabove. If the instruction type decoding unit 114 determines that the fetched instruction is uncompressed, then the uncompressed instruction may be provided directly to the processor through the multiplexer 128. If, however, the fetched instruction is a Type I compressed instruction, then operations continue at block 266 where a first logical data structure index field may be decoded to identify an address or location in a first logical data structure that is associated exclusively with the specific one of the plurality of routines. The first logical data structure may be implemented as the first routine, first frequency count data structure 72 of FIG. 5. The first logical data structure index may be implemented as the lower order six bits of a Type I compressed instruction as discussed hereinabove with respect to FIG. 17. At block 268, the uncompressed instruction that is located at the address or location in the first logical data structure routines (e.g., the first routine, first frequency count data structure 72) specified by the first logical data structure index, which is exclusively associated with the specific one of the plurality of routines, may then be provided to the processor for execution.

Figure 25:
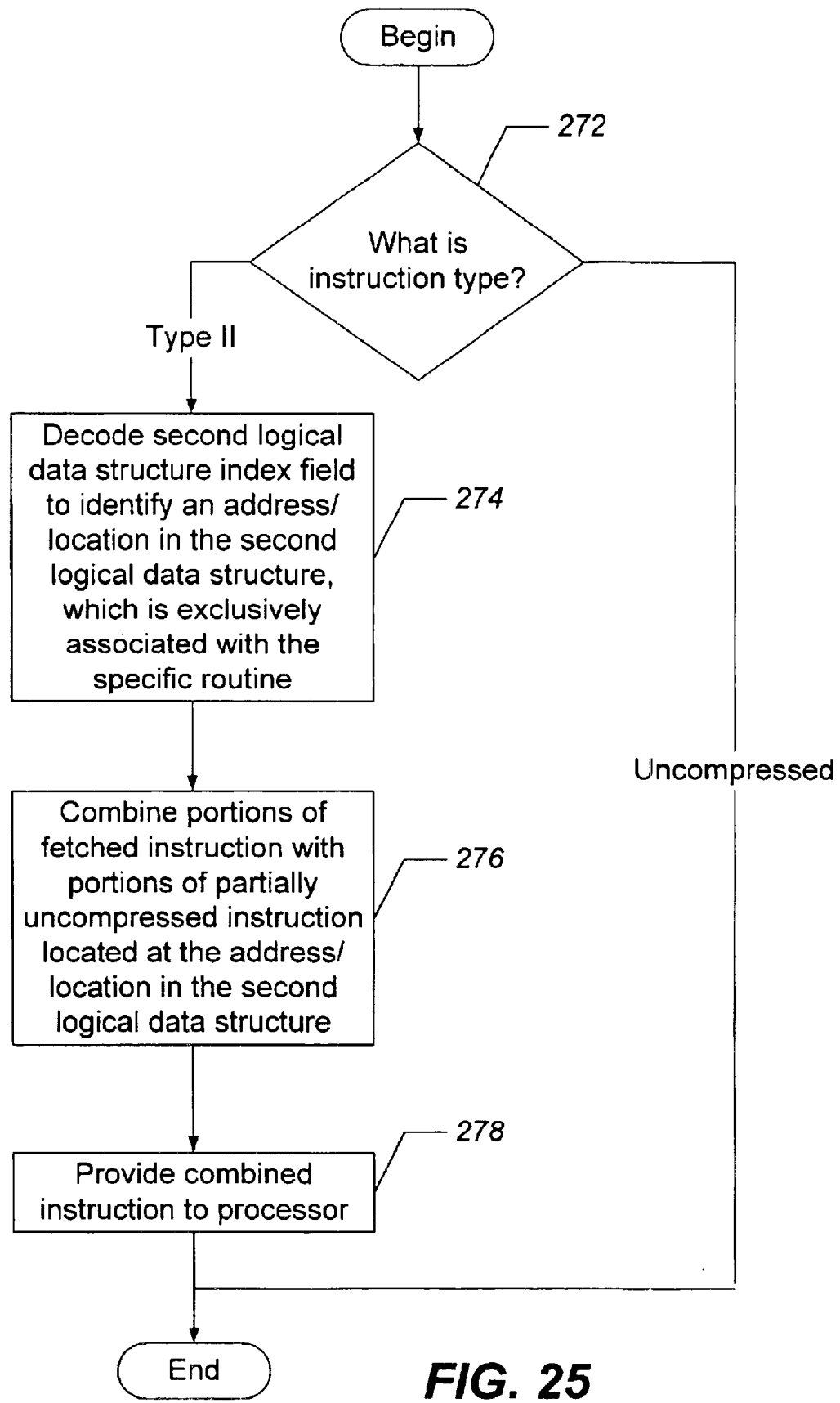

Referring now to FIG. 25, if the instruction type decoding unit 114 determines that the fetched instruction is a Type II compressed instruction that is associated with a specific one of the plurality of routines that comprise the compressed program 56 at block 272, then operations continue at block 274 where a second logical data structure index field may be decoded to identify an address or location in a second logical data structure that is associated with the specific one of the plurality of routines. The second logical data structure may be implemented as the first routine, second frequency count data structure 74 of FIG. 5. The second logical data structure index may be implemented as the lower order six bits of a Type II compressed instruction as discussed hereinabove with respect to FIG. 18. At block 276, the 14 bit uncompressed instruction that is located at the address or location in the second logical data structure (e.g., the first routine, second frequency count data structure 74) specified by the second logical data structure index, which is exclusively associated with the specific one of the plurality of routines, may then be combined with portions of the Type II compressed instruction and the contents of the source mask to reconstruct the replaced uncompressed instruction. Finally, at block 278, the combined instruction or reconstructed uncompressed instruction may be provided to the processor for execution.

Figure 26:
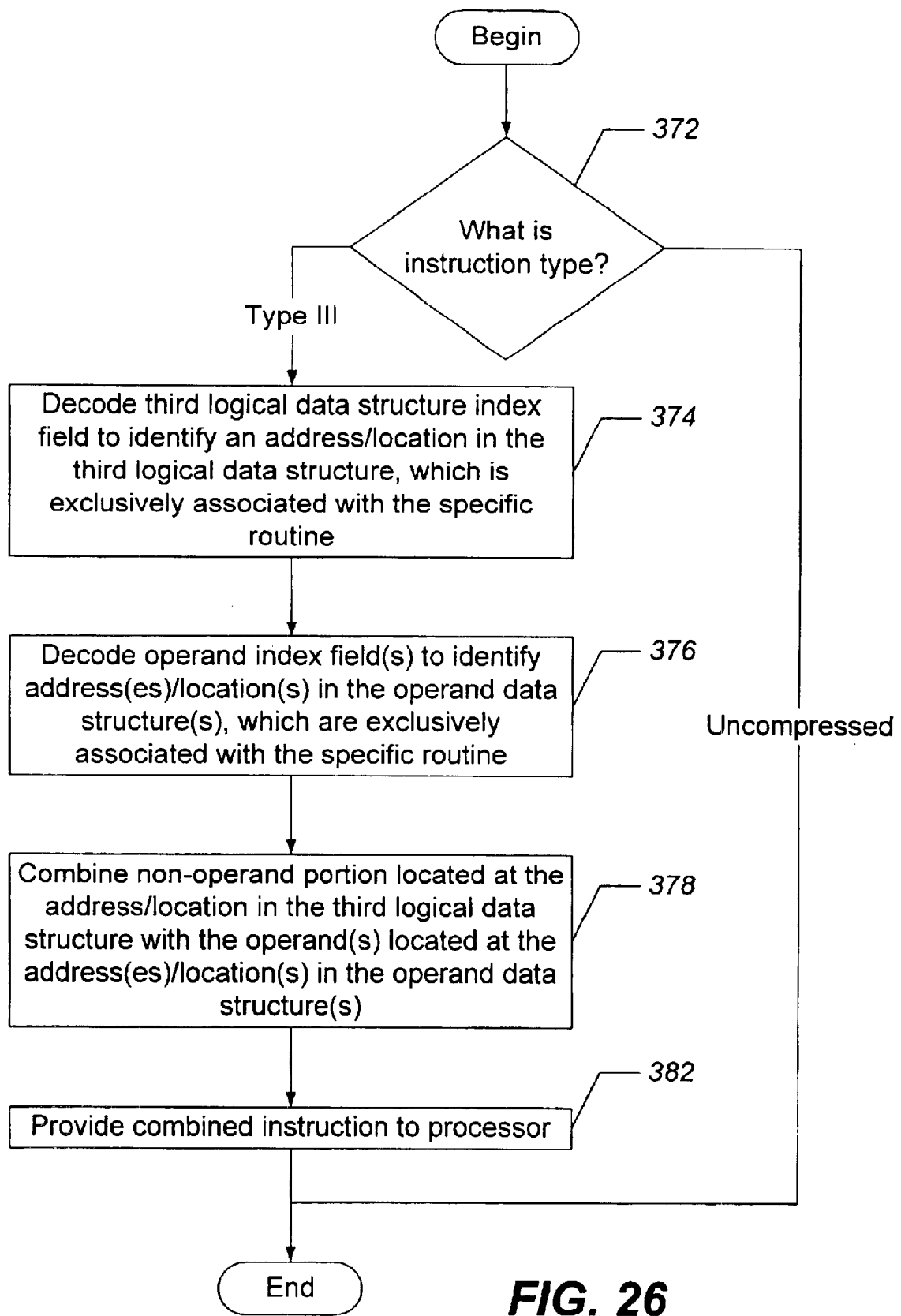

Referring now to FIG. 26, if the instruction type decoding unit 114 determines that the fetched instruction is a Type III compressed instruction that is associated with a specific one of the plurality of routines that comprise the compressed program 56 at block 372, then operations continue at block 374 where a third logical data structure index field may be decoded to identify an address or location in a third logical data structure that is associated with the specific one of the plurality of routines. The third logical data structure may be implemented as the first routine, third frequency count data structure 84 of FIG. 5. The third logical data structure index may be implemented as the lower order six bits of a Type III compressed instruction as discussed hereinabove with respect to FIG. 19.

At block 376, one or more operand index fields may be decoded to identify address(es) or location(s) in one or more operand data structures, respectively, which are associated with the specific one of the plurality of routines. The operand data structures may be implemented as the first routine, operand frequency count data structure(s) 86 of FIG. 5. The operand index fields may be implemented as the two, four bit fields between the instruction type field (two high order bits) and the third logical data structure index (six low order bits) as discussed hereinabove with respect to FIG. 19.

At block 378, the 14 bit uncompressed instruction that is located at the address or location in the third logical data structure (e.g., the first routine, third frequency count data structure 84) specified by the third logical data structure index, which is exclusively associated with the specific one of the plurality of routines, may then be combined with one or more operands located at the addresses or locations in the one or more operand data structures (e.g., the first routine, operand frequency count data structure(s) 86) specified by the operand index fields, which are also exclusively associated with the specific one of the plurality of routines, to reconstruct the replaced uncompressed instruction. Finally, at block 382, the combined instruction or reconstructed uncompressed instruction may be provided to the processor for execution.

From the foregoing it can readily be seen that, in accordance with the present invention, a computer program may be compressed either as a whole or on a per routine basis by replacing frequently used uncompressed instructions with compressed instructions of various types (i.e., lengths). Advantageously, the dynamic assignment of compressed instructions based on instruction frequency in specific application programs may provide improved program execution efficiency over alternative solutions that compress every instruction by a specific amount. That is, in accordance with the present invention, the more frequently used instructions may be replaced with compressed instructions, but less frequently used instructions may not be replaced thereby eliminating the need to decompress these less frequently used instructions before execution. By adjusting the frequency thresholds before an instruction qualifies for replacement with a compressed instruction, a suitable balance between memory conservation and execution speed may be obtained.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of compressing a computer program, comprising the steps of:
   scanning an initial computer program to identify a first plurality of uncompressed instructions therein having a high frequency of use;
   populating a First storage mechanism with the identified first plurality of uncompressed instructions; and
   generating a first compressed computer program by replacing each of a plurality of the identified first plurality of uncompressed instructions in the initial computer program with a respective first type of compressed instruction that identifies a location of the corresponding uncompressed instruction in the first storage mechanism.

2. A method as recited in claim 1, further comprising the steps of:
   scanning the first compressed computer program to identify a second plurality of uncompressed instructions that have a high frequency of use when at least a portion of their respective instruction operand is ignored;
   populating a second storage mechanism with the identified second plurality of uncompressed instructions; and
   generating a second compressed computer program by replacing each of a plurality of the identified second plurality of uncompressed instructions in the first compressed computer program with a respective second type of compressed instruction that identifies a location of the corresponding uncompressed instruction in the second storage mechanism.

3. A method as recited in claim 1, further comprising the step of:
   identifying addresses referenced in the initial computer program that are used by instructions that transfer control before the step of generating the first compressed computer program.

4. A method as recited in claim 3, further comprising the steps of:
   calculating new addresses for the first compressed computer program instructions;
   determining if the identified addresses that are used by instructions that transfer control have changed in response to the step of calculating new addresses for the first compressed computer program instructions; and
   updating each identified address that is referenced in the first compressed computer program and has changed with the calculated new address that corresponds thereto.

5. A method as recited in claim 4, wherein the step of updating each identified address that is referenced in the first compressed computer program and has changed with the calculated new address that corresponds thereto, comprises the steps of:
   storing the identified addresses that are used by instructions that transfer control in a second storage mechanism;
   associating each identified address that has changed with the calculated new address that corresponds thereto in the second storage mechanism; and
   updating each identified address that has changed with the calculated new address that is associated therewith in the second storage mechanism.

6. A method as recited in claim 1, wherein the computer program instructions follow a format in which at least two bits are used to define the instruction type.

7. A method as recited in claim 1, wherein the first storage mechanism and the second storage mechanism comprise a single data structure.

8. A method as recited in claim 1, wherein the first storage mechanism and the second storage mechanism comprise separate data structures.

9. A method as recited in claim 1, wherein the step of scanning an initial computer program to identify a first plurality of uncompressed instructions therein having a high frequency of use comprises the step of:
   scanning the initial computer program to identify the first plurality of uncompressed instructions therein having a high frequency of use based on a non-operand portion thereof; and wherein the method further comprises the steps of:
   scanning the initial computer program to identify a first plurality of operands therein having a high frequency of use; and
   populating a second storage mechanism with the identified first plurality of operands.

10. A method of compressing a computer program, comprising the steps of:
    scanning an initial computer program to identify a first plurality of uncompressed instructions therein based on a first compression criterion;
    populating a first storage mechanism with the identified first plurality of uncompressed instructions; and generating a first compressed computer program by replacing each of a plurality of the identified first plurality of uncompressed instructions in the initial computer program with a respective first compressed instruction that identifies a location of the corresponding uncompressed instruction in the first storage mechanism.

11. A method as recited in claim 10, further comprising the steps of:

scanning the first compressed computer program to identify a second plurality of uncompressed instructions based on a second compression criterion;

populating a second storage mechanism with the identified second plurality of uncompressed instructions; and generating a second compressed computer program by replacing each of a plurality of the identified second plurality of uncompressed instructions in the first compressed computer program with a respective second compressed instruction that identifies a location of the corresponding uncompressed instruction in the second storage mechanism.

12. A method as recited in claim 11, wherein the first compression criterion is instruction frequency of use and wherein the second compression criterion is instruction frequency of use when at least a portion of their respective instruction operand is ignored.

13. A method as recited in claim 10, wherein the first compression criterion is instruction execution speed.

14. A method of compressing a computer program, comprising the steps of:

respectively scanning each of a plurality of routines in an initial computer program to identify a first plurality of uncompressed instructions in each of the plurality of routines that have a high frequency of use;

respectively populating first storage mechanisms with the identified first plurality of uncompressed instructions from each of the plurality of routines; and generating a first compressed computer program by respectively replacing each of a plurality of the identified first plurality of uncompressed instructions in each of the plurality of routines with a respective first compressed instruction that identifies a location of the corresponding uncompressed instruction in a respective one of the first storage mechanisms.

15. A method as recited in claim 14, further comprising the steps of:

respectively scanning each of the plurality of routines in the first compressed computer program to identify a second plurality of uncompressed instructions in each of the plurality of routines that have a high frequency of use;

respectively populating second storage mechanisms with the identified second plurality of uncompressed instructions from each of the plurality of routines; and generating a second compressed computer program by respectively replacing each of a plurality of the identified second plurality of uncompressed instructions in each of the plurality of routines with a respective second compressed instruction that identifies a location of the corresponding uncompressed instruction in a respective one of the second storage mechanisms.

16. A method of executing a computer program, comprising the steps of:

fetching an instruction from a memory;

decoding the fetched instruction to determine whether the fetched instruction is an uncompressed instruction, a first type of compressed instruction, a second type of compressed instruction, or a third type of compressed instruction;

decoding the fetched instruction to identify a location in a first logical data structure, if the fetched instruction is a compressed instruction of the first type;

providing a first uncompressed instruction, which is located at the location in the first logical data structure, to a processor for execution if the fetched instruction is a compressed instruction of the first type;

decoding the fetched instruction to identify a location in a second logical data structure, if the fetched instruction is a compressed instruction of the second type;

combining portions of the fetched instruction with portions of an at least partially uncompressed instruction, which is located at the location in the second logical data structure, to generate a second uncompressed instruction if the fetched instruction is a compressed instruction of the second type;

providing the second uncompressed instruction to the processor for execution if the fetched instruction is a compressed instruction of the second type;

decoding the fetched instruction to identify a location in a third logical data structure, if the fetched instruction is a compressed instruction of the third type;

decoding the fetched instruction to identify a location in an operand data structure, if the fetched instruction is a compressed instruction of the third type;

combining a non-operand portion of an uncompressed instruction, which is located at the location in the third logical data structure, with an operand portion of the uncompressed instruction, which is located at the location in the operand data structure, to generate a third uncompressed instruction if the fetched instruction is a compressed instruction of the third type; and providing the third uncompressed instruction to the processor for execution, if the fetched instruction is a compressed instruction of the third type.

17. A method as recited in claim 16, further comprising the steps of:

downloading the first logical data structure from the memory to a first decompression sub-engine before the step of decoding the fetched instruction to identify a location in the first logical data structure;

downloading the second logical data structure from the memory to a second decompression sub-engine before the step of decoding the fetched instruction to identify a location in the second logical data structure;

downloading the third logical data structure and the operand data structure from the memory to a third decompression sub-engine before the steps of decoding the fetched instruction to identify a location in the third logical data structure and decoding the fetched instruction to identify a location in the operand data structure;

providing the fetched instruction to the first decompression sub-engine if the fetched instruction is a compressed instruction of the first type before the step of decoding the fetched instruction to identify a location in the first logical data structure;

providing the fetched instruction to the second decompression sub-engine if the fetched instruction is a compressed instruction of the second type before the step of decoding the fetched instruction to identify a location in the second logical data structure; and providing the fetched instruction to the third decompression sub-engine if the fetched instruction is a compressed instruction of the third type before the steps of decoding the fetched instruction to identify a location in the third logical data structure and decoding the fetched instruction to identify a location in the operand data structure.

18. A method as recited in claim 16, wherein the first logical data structure and the second logical data structure comprise a single data structure.

19. A method as recited in claim 16, wherein the first logical data structure and the second logical data structure comprise separate data structures.

20. A method of executing a computer program, comprising the steps of:
fetching an instruction associated with one of a plurality of routines from a memory;
decoding the fetched instruction to determine whether the fetched instruction is an uncompressed instruction or a first type of compressed instruction;
decoding the fetched instruction to identify a location in a first logical data structure that is exclusively associated with the one of the plurality of routines, if the fetched instruction is a compressed instruction of the first type; and
providing a first uncompressed instruction, which is located at the location in the first logical data structure, to a processor for execution if the fetched instruction is a compressed instruction of the first type.

21. A method as recited in claim 20, wherein the step of decoding the fetched instruction to determine whether the fetched instruction is an uncompressed instruction or a first type of compressed instruction comprises the step of:
decoding the fetched instruction to determine whether the fetched instruction is an uncompressed instruction, a first type of compressed instruction, a second type of compressed instruction, or a third type of compressed instruction.

22. A method as recited in claim 21, further comprising the steps of:
decoding the fetched instruction to identify a location in a second logical data structure that is exclusively associated with the one of the plurality of routines, if the fetched instruction is a compressed instruction of the second type;
combining portions of the fetched instruction with portions of an at least partially uncompressed instruction, which is located at the location in the second logical data structure, to generate a second uncompressed instruction if the fetched instruction is a compressed instruction of the second type;
providing the second uncompressed instruction to the processor for execution if the fetched instruction is a compressed instruction of the second type;
decoding the fetched instruction to identify a location in a third logical data structure that is exclusively associated with the one of the plurality of routines, if the fetched instruction is a compressed instruction of the third type;
decoding the fetched instruction to identify a location in an operand data structure that is exclusively associated with the one of the plurality of routines, if the fetched instruction is a compressed instruction of the third type;
combining a non-operand portion of an uncompressed instruction, which is located at the location in the third logical data structure, with an operand portion of the uncompressed instruction, which is located at the location in the operand data structure, to generate a third uncompressed instruction if the fetched instruction is a compressed instruction of the third type; and
providing the third uncompressed instruction to the processor for execution, if the fetched instruction is a compressed instruction of the third type.

23. A method as recited in claim 22, wherein the first logical data structure and the second logical data structure comprise a single data structure.

24. A method as recited in claim 22, wherein the first logical data structure and the second logical data structure comprise separate data structures.

25. A data processing system for decompressing compressed computer program instructions, comprising:
an instruction type decoding unit having a data input that receives an instruction and determines whether the received instruction is an uncompressed instruction, a first type of compressed instruction, a second type of compressed instruction, or a third type of compressed instruction;
a first decompression sub-engine for the first type of compressed instruction having a data input coupled to a first data output of the instruction type decoding unit; and
a second decompression sub-engine for the second type of compressed instruction having a data input coupled to a second data output of the instruction type decoding unit.

26. A data processing system as recited in claim 25, further comprising:
a third decompression sub-engine for the third type of compressed instruction having a data input coupled to a third data output of the instruction type decoding unit.

27. A data processing system as recited in claim 26, wherein the first decompression sub-engine comprises a first memory that is configured with a first data structure in which compressed instructions of the first type are respectively associated with first uncompressed instructions.

28. A data processing system as recited in claim 27, wherein the second decompression sub-engine comprises a second memory that is configured with a second data structure in which compressed instructions of the second type are respectively associated with second at least partially uncompressed instructions.

29. A data processing system as recited in claim 28, wherein the third decompression sub-engine comprises a third memory that is configured with a third data structure in which compressed instructions of the third type are respectively associated with third at least partially uncompressed instructions.

30. A data processing system as recited in claim 26, wherein the first, second, and third decompression sub-engines are communicatively coupled to a main memory, and wherein the instruction type decoding unit further comprises:
a data structure load unit that is configured to detect a data structure load instruction and to facilitate downloading the first, second, and third data structures to the first, second, and third decompression sub-engines, respectively.

31. A data processing system as recited in claim 26, further comprising:
a multiplexer having a first data input coupled to a third data output of the instruction type decoding unit, a second data input coupled to a data output of the first decompression sub-engine, a third data input coupled to a data output of the second decompression sub-engine, a fourth data input coupled to a data output of the third decompression sub-engine, and a select input that receives a select signal generated by the instruction type decoding unit.

32. A data processing system as recited in claim 25, further comprising:

an address translation unit having a data input that receives an instruction address from a processor and that generates in response thereto a jump signal if the instruction address is indicative of a transfer of control, that generates a sequential signal if the instruction address is indicative of sequential instruction execution;

a memory fetch unit having first, second, and third data inputs for receiving the jump signal, the sequential signal, and the instruction address from the address translation unit and a data output that is communicatively coupled to a main memory; and a current address register that is communicatively coupled to the memory fetch unit and the instruction type decoding unit and that contains an address of the received instruction.

33. A data processing system as recited in claim 25, further comprising:

a buffer having a data input that is communicatively coupled to the main memory for receiving the received instruction from the main memory, a data output that is coupled to the data input of the instruction type decoding unit, and a reset input that is coupled to the jump signal.

34. A system for compressing a computer program, comprising:

means for scanning an initial computer program to identify a first plurality of uncompressed instructions therein having a high frequency of use;

means for populating a first storage mechanism with the identified first plurality of uncompressed instructions; and means for generating a first compressed computer program by replacing each of a plurality of the identified first plurality of uncompressed instructions in the initial computer program with a respective first type of compressed instruction that identifies a location of the corresponding uncompressed instruction in the first storage mechanism.

35. A system as recited in claim 34, further comprising:

means for scanning the first compressed computer program to identify a second plurality of uncompressed instructions that have a high frequency of use when at least a portion of their respective instruction operand is ignored;

means for populating a second storage mechanism with the identified second plurality of uncompressed instructions; and means for generating a second compressed computer program by replacing each of a plurality of the identified second plurality of uncompressed instructions in the first compressed computer program with a respective second type of compressed instruction that identifies a location of the corresponding uncompressed instruction in the second storage mechanism.

36. A system as recited in claim 34, further comprising:

means for identifying addresses referenced in the initial computer program that are used by instructions that transfer control, the means for generating the first compressed computer program being responsive to the means for identifying addresses.

37. A system as recited in claim 36, further comprising:

means for calculating new addresses for the first compressed computer program instructions;

means for determining if the identified addresses that are used by instructions that transfer control have changed, the means for determining being responsive to the means for calculating new addresses for the first compressed computer program instructions; and means for updating each identified address that is referenced in the first compressed computer program and has changed with the calculated new address that corresponds thereto.

38. A system as recited in claim 37, wherein the means for updating each identified address that is referenced in the first compressed computer program and has changed with the calculated new address that corresponds thereto, comprises:

means for storing the identified addresses that are used by instructions that transfer control in a second storage mechanism;

means for associating each identified address that has changed with the calculated new address that corresponds thereto in the second storage mechanism; and means for updating each identified address that has changed with the calculated new address that is associated therewith in the second storage mechanism.

39. A system as recited in claim 34, wherein the computer program instructions follow a format in which at least two bits are used to define the instruction type.

40. A system as recited in claim 34, wherein the first storage mechanism and the second storage mechanism comprise a single data structure.

41. A system as recited in claim 34, wherein the first storage mechanism and the second storage mechanism comprise separate data structures.

42. A system for compressing a computer program, comprising:

means for scanning an initial computer program to identify a first plurality of uncompressed instructions therein based on a first compression criterion;

means for populating a first storage mechanism with the identified first plurality of uncompressed instructions; and means for generating a first compressed computer program by replacing each of a plurality of the identified first plurality of uncompressed instructions in the initial computer program with a respective first compressed instruction that identifies a location of the corresponding uncompressed instruction in the first storage mechanism.

43. A system as recited in claim 42, further comprising:

means for scanning the first compressed computer program to identify a second plurality of uncompressed instructions based on a second compression criterion;

means for populating a second storage mechanism with the identified second plurality of uncompressed instructions; and means for generating a second compressed computer program by replacing each of a plurality of the identified second plurality of uncompressed instructions in the first compressed computer program with a respective second compressed instruction that identifies a location of the corresponding uncompressed instruction in the second storage mechanism.

44. A system as recited in claim 43, wherein the first compression criterion is instruction frequency of use and wherein the second compression criterion is instruction frequency of use when at least a portion of their respective instruction operand is ignored.

45. A system as recited in claim 42, wherein the first compression criterion is instruction execution speed.

46. A system for executing a computer program, comprising:

means for fetching an instruction from a memory;

means for decoding the fetched instruction to determine whether the fetched instruction is an uncompressed instruction, a first type of compressed instruction, or a second type of compressed instruction;

means for decoding the fetched instruction to identify a location in a first logical data structure, if the fetched instruction is a compressed instruction of the first type;

means for providing a first uncompressed instruction, which is located at the location in the first logical data structure, to a processor for execution if the fetched instruction is a compressed instruction of the first type;

means for decoding the fetched instruction to identify a location in a second logical data structure, if the fetched instruction is a compressed instruction of the second type;

means for combining portions of the fetched instruction with portions of an at least partially uncompressed instruction, which is located at the location in the second logical data structure, to generate a second uncompressed instruction if the fetched instruction is a compressed instruction of the second type; and means for providing the second uncompressed instruction to the processor for execution if the fetched instruction is a compressed instruction of the second type;

means for decoding the fetched instruction to identify a location in a third logical data structure, if the fetched instruction is a compressed instruction of the third type;

means for decoding the fetched instruction to identify a location in an operand data structure, if the fetched instruction is a compressed instruction of the third type;

means for combining a non-operand portion of an uncompressed instruction, which is located at the location in the third logical data structure, with an operand portion of the uncompressed instruction, which is located at the location in the operand data structure, to generate a third uncompressed instruction if the fetched instruction is a compressed instruction of the third type; and means for providing the third uncompressed instruction to the processor for execution, if the fetched instruction is a compressed instruction of the third type.

47. A system as recited in claim 46, further comprising:

means for downloading the first logical data structure from the memory to a first decompression sub-engine, the means for decoding the fetched instruction to identify a location in the first logical data structure being responsive to the means for downloading the first logical data structure;

means for downloading the second logical data structure from the memory to a second decompression sub-engine, the means for decoding the fetched instruction to identify a location in the second logical data structure being responsive to the means for downloading the second logical data structure;

means for downloading the third logical data structure and the operand data structure from the memory to a third decompression sub-engine, the means for decoding the fetched instruction to identify a location in the third logical data structure and the means for decoding the fetched instruction to identify a location in the operand data structure being responsive to the means for downloading the third logical data structure;

means for providing the fetched instruction to the first decompression sub-engine if the fetched instruction is a compressed instruction of the first type that is responsive to the means for decoding the fetched instruction to identify a location in the first logical data structure;

means for providing the fetched instruction to the second decompression sub-engine if the fetched instruction is a compressed instruction of the second type that is responsive to the means for decoding the fetched instruction to identify a location in the second logical data structure; and means for providing the fetched instruction to the third decompression sub-engine if the fetched instruction is a compressed instruction of the third type before the steps of decoding the fetched instruction to identify a location in the third logical data structure and decoding the fetched instruction to identify a location in the operand data structure.

48. A system as recited in claim 46, wherein the first logical data structure and the second logical data structure comprise a single data structure.

49. A system as recited in claim 46, wherein the first logical data structure and the second logical data structure comprise separate data structures.

50. A system for executing a computer program, comprising:

means for fetching an instruction associated with one of a plurality of routines from a memory;

means for decoding the fetched instruction to determine whether the fetched instruction is an uncompressed instruction or a first type of compressed instruction;

means for decoding the fetched instruction to identify a location in a first logical data structure that is exclusively associated with the one of the plurality of routines, if the fetched instruction is a compressed instruction of the first type; and means for providing a first uncompressed instruction, which is located at the location in the first logical data structure, to a processor for execution if the fetched instruction is a compressed instruction of the first type.

51. A system as recited in claim 50, wherein the means for decoding the fetched instruction to determine whether the fetched instruction is an uncompressed instruction or a first type of compressed instruction comprises:

means for decoding the fetched instruction to determine whether the fetched instruction is an uncompressed instruction, a first type of compressed instruction, a second type of compressed instruction, or a third type of compressed instruction.

52. A system as recited in claim 51, further comprising:

means for decoding the fetched instruction to identify a location in a second logical data structure that is exclusively associated with the one of the plurality of routines, if the fetched instruction is a compressed instruction of the second type;

means for combining portions of the fetched instruction with portions of an at least partially uncompressed instruction, which is located at the location in the second logical data structure, to generate a second uncompressed instruction if the fetched instruction is a compressed instruction of the second type;

means for providing the second uncompressed instruction to the processor for execution if the fetched instruction is a compressed instruction of the second type;

means for decoding the fetched instruction to identify a location in a third logical data structure that is exclusively associated with the one of the plurality of routines, if the fetched instruction is a compressed instruction of the third type;

means for decoding the fetched instruction to identify a location in an operand data structure that is exclusively associated with the one of the plurality of routines, if the fetched instruction is a compressed instruction of the third type;

means for combining a non-operand portion of an uncompressed instruction, which is located at the location in the third logical data structure, with an operand portion of the uncompressed instruction, which is located at the location in the operand data structure, to generate a third uncompressed instruction if the fetched instruction is a compressed instruction of the third type; and means for providing the third uncompressed instruction to the processor for execution, if the fetched instruction is a compressed instruction of the third type.

53. A system as recited in claim 52, wherein the first logical data structure and the second logical data structure comprise a single data structure.

54. A system as recited in claim 52, wherein the first logical data structure and the second logical data structure comprise separate data structures.

55. A computer program product for compressing a computer program, comprising:

a computer readable storage medium having computer readable program code embodied therein, the computer readable program code comprising:

computer readable program code for scanning an initial computer program to identify a first plurality of uncompressed instructions therein having a high frequency of use;

computer readable program code for populating a first storage mechanism with the identified first plurality of uncompressed instructions; and computer readable program code for generating a first compressed computer program by replacing each of a plurality of the identified first plurality of uncompressed instructions in the initial computer program with a respective first type of compressed instruction that identifies a location of the corresponding uncompressed instruction in the first storage mechanism.

56. A computer program product as recited in claim 55, further comprising:

computer readable program code for scanning the first compressed computer program to identify a second plurality of uncompressed instructions that have a high frequency of use when at least a portion of their respective instruction operand is ignored;

computer readable program code for populating a second storage mechanism with the identified second plurality of uncompressed instructions; and computer readable program code for generating a second compressed computer program by replacing each of a plurality of the identified second plurality of uncompressed instructions in the first compressed computer program with a respective second type of compressed instruction that identifies a location of the corresponding uncompressed instruction in the second storage mechanism.

57. A computer program product as recited in claim 55, further comprising:

computer readable program code for identifying addresses referenced in the initial computer program that are used by instructions that transfer control, the computer readable program code for generating the first compressed computer program being responsive to the computer readable program code for identifying addresses.

58. A computer program product as recited in claim 57, further comprising:

computer readable program code for calculating new addresses for the first compressed computer program instructions;

computer readable program code for determining if the identified addresses that are used by instructions that transfer control have changed, the computer readable program code for determining being responsive to the computer readable program code for calculating new addresses for the first compressed computer program instructions; and computer readable program code for updating each identified address that is referenced in the first compressed computer program and has changed with the calculated new address that corresponds thereto.

59. A computer program product as recited in claim 58, wherein the computer readable program code for updating each identified address that is referenced in the first compressed computer program and has changed with the calculated new address that corresponds thereto, comprises:

computer readable program code for storing the identified addresses that are used by instructions that transfer control in a second storage mechanism;

computer readable program code for associating each identified address that has changed with the calculated new address that corresponds thereto in the second storage mechanism; and computer readable program code for updating each identified address that has changed with the calculated new address that is associated therewith in the second storage mechanism.

60. A computer program product as recited in claim 55, wherein the computer program instructions follow a format in which at least two bits are used to define the instruction type.

61. A computer program product as recited in claim 55, wherein the first storage mechanism and the second storage mechanism comprise a single data structure.

62. A computer program product as recited in claim 55, wherein the first storage mechanism and the second storage mechanism comprise separate data structures.

63. A computer program product for compressing a computer program, comprising:

a computer readable storage medium having computer readable program code embodied therein, the computer readable program code comprising:

computer readable program code for scanning an initial computer program to identify a first plurality of uncompressed instructions therein based on a First compression criterion;

computer readable program code for populating a first storage mechanism with the identified first plurality of uncompressed instructions; and computer readable program code for generating a first compressed computer program by replacing each of a plurality of the identified first plurality of uncompressed instructions in the initial computer program with a respective first compressed instruction that identifies a location of the corresponding uncompressed instruction in the first storage mechanism.

64. A computer program product as recited in claim 63, further comprising:

computer readable program code for scanning the first compressed computer program to identify a second plurality of uncompressed instructions based on a second compression criterion;

computer readable program code for populating a second storage mechanism with the identified second plurality of uncompressed instructions; and computer readable program code for generating a second compressed computer program by replacing each of a plurality of the identified second plurality of uncompressed instructions in the first compressed computer program with a respective second compressed instruction that identifies a location of the corresponding uncompressed instruction in the second storage mechanism.

65. A computer program product as recited in claim 64, wherein the first compression criterion is instruction frequency of use and wherein the second compression criterion is instruction frequency of use when at least a portion of their respective instruction operand is ignored.

66. A computer program product as recited in claim 63, wherein the first compression criterion is instruction execution speed.

67. A computer program product for executing a computer program, comprising:

a computer readable storage medium having computer readable program code embodied therein, the computer readable program code comprising:

computer readable program code for fetching an instruction from a memory;

computer readable program code for decoding the fetched instruction to determine whether the fetched instruction is an uncompressed instruction, a first type of compressed instruction, or a second type of compressed instruction;

computer readable program code for decoding the fetched instruction to identify a location in a first logical data structure, if the fetched instruction is a compressed instruction of the first type;

computer readable program code for providing a first uncompressed instruction, which is located at the location in the first logical data structure, to a processor for execution if the fetched instruction is a compressed instruction of the first type;

computer readable program code for decoding the fetched instruction to identify a location in a second logical data structure, if the fetched instruction is a compressed instruction of the second type;

computer readable program code for combining portions of the fetched instruction with portions of an at least partially uncompressed instruction, which is located at the location in the second logical data structure, to generate a second uncompressed instruction if the fetched instruction is a compressed instruction of the second type; and computer readable program code for providing the second uncompressed instruction to the processor for execution if the fetched instruction is a compressed instruction of the second type;

computer readable program code for decoding the fetched instruction to identify a location in a third logical data structure, if the fetched instruction is a compressed instruction of the third type;

computer readable program code for decoding the fetched instruction to identify a location in an operand data structure, if the fetched instruction is a compressed instruction of the third type;

computer readable program code for combining a non-operand portion of an uncompressed instruction, which is located at the location in the third logical data structure, with an operand portion of the uncompressed instruction, which is located at the location in the operand data structure, to generate a third uncompressed instruction if the fetched instruction is a compressed instruction of the third type; and computer readable program code for providing the third uncompressed instruction to the processor for execution, if the fetched instruction is a compressed instruction of the third type.

68. A computer program product as recited in claim 67, further comprising:

computer readable program code for downloading the first logical data structure from the memory to a first decompression sub-engine, the computer readable program code for decoding the fetched instruction to identify a location in the first logical data structure being responsive to the computer readable program code for downloading the first logical data structure;

computer readable program code for downloading the second logical data structure from the memory to a second decompression sub-engine, the computer readable program code for decoding the fetched instruction to identify a location in the second logical data structure being responsive to the computer readable program code for downloading the second logical data structure;

computer readable program code for downloading the third logical data structure and the operand data structure from the memory to a third decompression sub-engine, the computer readable program code for decoding the fetched instruction to identify a location in the third logical data structure and the computer readable program code for decoding the fetched instruction to identify a location in the operand data structure being responsive to the computer readable program code for downloading the third logical data structure;

computer readable program code for providing the fetched instruction to the first decompression sub-engine if the fetched instruction is a compressed instruction of the first type that is responsive to the computer readable program code for decoding the fetched instruction to identify a location in the first logical data structure;

computer readable program code for providing the fetched instruction to the second decompression sub-engine if the fetched instruction is a compressed instruction of the second type that is responsive to the computer readable program code for decoding the fetched instruction to identify a location in the second logical data structure; and computer readable program code for providing the fetched instruction to the third decompression sub-engine if the fetched instruction is a compressed instruction of the third type before the steps of decoding the fetched instruction to identify a location in the third logical data structure and decoding the fetched instruction to identity a location in the operand data structure.

69. A computer program product as recited in claim 67, wherein the first logical data structure and the second logical data structure comprise a single data structure.

70. A computer program product as recited in claim 67, wherein the first logical data structure and the second logical data structure comprise separate data structures.

71. A computer program product for executing a computer program, comprising:

a computer readable storage medium having computer readable program code embodied therein, the computer readable program code comprising:

computer readable program code for fetching an instruction associated with one of a plurality of routines from a memory;

computer readable program code for decoding the fetched instruction to determine whether the fetched instruction is an uncompressed instruction or a first type of compressed instruction;

computer readable program code for decoding the fetched instruction to identify a location in a first logical data structure that is exclusively associated with the one of the plurality of routines, if the fetched instruction is a compressed instruction of the first type; and computer readable program code for providing a first uncompressed instruction, which is located at the location in the first logical data structure, to a processor for execution if the fetched instruction is a compressed instruction of the first type.

72. A computer program product as recited in claim 71, wherein the computer readable program code for decoding the fetched instruction to determine whether the fetched instruction is an uncompressed instruction or a first type of compressed instruction comprises:

computer readable program code for decoding the fetched instruction to determine whether the fetched instruction is an uncompressed instruction, a first type of compressed instruction, a second type of compressed instruction, or a third type of compressed instruction.

73. A. A computer program product as recited in claim 72, further comprising:

computer readable program code for decoding the fetched instruction to identify a location in a second logical data structure that is exclusively associated with the one of the plurality of routines, if the fetched instruction is a compressed instruction of the second type;

computer readable program code for combining portions of the fetched instruction with portions of an at least partially uncompressed instruction, which is located at the location in the second logical data structure, to generate a second uncompressed instruction if the fetched instruction is a compressed instruction of the second type;

computer readable program code for providing the second uncompressed instruction to the processor for execution if the fetched instruction is a compressed instruction of the second type;

computer readable program code for decoding the fetched instruction to identify a location in a third logical data structure that is exclusively associated with the one of the plurality of routines, if the fetched instruction is a compressed instruction of the third type;

computer readable program code for decoding the fetched instruction to identify a location in an operand data structure that is exclusively associated with the one of the plurality of routines, if the fetched instruction is a compressed instruction of the third type;

computer readable program code for combining a non-operand portion of an uncompressed instruction, which is located at the location in the third logical data structure, with an operand portion of the uncompressed instruction, which is located at the location in the operand data structure, to generate a third uncompressed instruction if the fetched instruction is a compressed instruction of the third type; and computer readable program code for providing the third uncompressed instruction to the processor for execution, if the fetched instruction is a compressed instruction of the third type.

74. A computer program product as recited in claim 73, wherein the first logical data structure and the second logical data structure comprise a single data structure.

75. A computer program product as recited in claim 73, wherein the first logical data structure and the second logical data structure comprise separate data structures.

* * * * *